US010467336B2

(12) United States Patent  (10) Patent No.: US 10,467,336 B2
Romney  (45) Date of Patent: Nov. 5, 2019

(54) APPARATUS AND METHOD FOR PROCESSING CITATIONS WITHIN A DOCUMENT

(71) Applicant: John Romney, Austin, TX (US)

(72) Inventor: John Romney, Austin, TX (US)

( * ) Notice: Subject to any disclaimer, the term of this patent is extended or adjusted under 35 U.S.C. 154(b) by 0 days.

(21) Appl. No.: 14/821,603

(22) Filed: Aug. 7, 2015

(65) Prior Publication Data

US 2016/0041961 A1   Feb. 11, 2016

Related U.S. Application Data

(60) Provisional application No. 62/034,166, filed on Aug. 7, 2014.

(51) Int. Cl.
  *G06F 3/00*   (2006.01)
  *G06F 17/24*  (2006.01)
  *G06F 17/21*  (2006.01)
  *G06F 17/22*  (2006.01)

(52) U.S. Cl.
  CPC .......... *G06F 17/241* (2013.01); *G06F 17/212* (2013.01); *G06F 17/2229* (2013.01)

(58) Field of Classification Search
  CPC ... G06F 17/212; G06F 17/2229; G06F 17/241
  See application file for complete search history.

(56) References Cited

U.S. PATENT DOCUMENTS

| 5,251,316 A * | 10/1993 | Anick | G06F 17/30737 |
| 2009/0171905 A1* | 7/2009 | Garcia | G06F 17/30728 |
| 2009/0287988 A1* | 11/2009 | Cohen | G06F 9/543 |
|  |  |  | 715/204 |
| 2011/0060761 A1* | 3/2011 | Fouts | G06F 17/21 |
|  |  |  | 707/770 |
| 2012/0109884 A1* | 5/2012 | Goldentouch | G06F 17/24 |
|  |  |  | 707/608 |
| 2014/0006424 A1* | 1/2014 | Al-Kofahi | G06F 17/30 |
|  |  |  | 707/754 |
| 2014/0016151 A1* | 1/2014 | Malik | G09G 5/026 |
|  |  |  | 358/1.13 |

* cited by examiner

*Primary Examiner* — Kyle R Stork
(74) *Attorney, Agent, or Firm* — Kunzler Bean & Adamson, PC

(57) ABSTRACT

A method for handling bibliographic citations within a document is disclosed. The method involves providing a user access to a publication list through a word processing application. The publication list has bibliographic citation data the publications in the publication list. Upon command from a user, a bibliographic citation to a selected publication in the publication list is inserted into a document displayed by the word processing application. The bibliographic citation is inserted as a non-editable text unit. The bibliographic citation in the document is updated with an edited bibliographic citation when the bibliographic citation data for the selected publication is edited.

15 Claims, 20 Drawing Sheets

APPARATUS AND METHOD FOR PROCESSING CITATIONS WITHIN A DOCUMENT

CROSS REFERENCE TO RELATED APPLICATIONS

This application claims the benefit of U.S. Provisional Patent Application No. 62/034,166 entitled "ACADEMIC RESEARCH AND WRITING PRODUCTIVITY PLATFORM AND MANAGEMENT SYSTEM" and filed on Aug. 7, 2014 for John Romney, which is incorporated herein by reference in its entirety.

BACKGROUND

Scholarly and scientific research and writing involves the rigorous and often tedious process of research, literature review, and writing. When researching, individuals search through one or more physical or electronic databases for information on their topic of interest. Their search can uncover material in books, journal articles, periodicals, and other published works. In some disciplines, particularly in some academic disciplines, this step may necessitate that a researcher searches through multiple separate databases to ensure that they have identified all relevant publications on their topic of interest in order to gain a complete understand of the state of knowledge on a given topic. Frequently this means that a researcher will search through largely redundant databases to identify any unique works published in each database. This step may identify tens or even hundreds of potentially relevant publications.

After relevant publications are identified, the researcher must review these materials to determine if and how each will be used in a new publication. This type of literature review can be very labor intensive, requiring the reviewer to read through and filter each identified work. Each reviewer may have different preferences for reviewing publications. For instance, some may save each document in an electronic format and review it on a computer, while others may print out physical copies that they manually highlight and annotate. Ultimately, the set of works is narrowed down, categorized, and a list of works to be used in the new publication is identified. In some cases, the research and review processes consumes at least half of the time dedicated to the research and writing process.

Next, a new publication is conceptualized and written. In the writing process, authors may use bibliographic citations to reference to the publications identified in their research. The accurate insertion of these citations, which typically follow strict formatting conventions, can be time consuming for authors and requires frequent reference to the notes made in the literature review process as well as to citation formatting guidelines. Frequently citations errors are made in new papers, despite the author's best efforts to avoid them.

Each step of the research and writing process is further complicated when multiple individuals are involved, which is frequently the case in university-level academic research and writing. Each additional individual adds difficulty to the task of collaborating the research, literature review, and writing steps.

The various aspects of the present invention, described herein, provide an apparatus, system, and method that can facilitate the process of research, literature review, and writing as well as the collaborating this process between multiple authors and/or researchers. The present invention also provides a method and apparatus for processing bibliographic citations within a paper.

SUMMARY

One aspect of the invention is a method for processing bibliographic citations within a document. The method includes providing a user access to a publication list through a word processing application. The publication list has bibliographic citation data the publications in the publication list. Upon command from a user, a bibliographic citation to a selected publication in the publication list is inserted into a document displayed by the word processing application. The bibliographic citation is inserted as a non-editable text unit. The bibliographic citation in the document is updated with an edited bibliographic citation when the bibliographic citation data for the selected publication is edited.

In another aspect includes a computer-based method for managing bibliographic citations within a document. The method includes storing a publication list in an electronic database. The publication list includes bibliographic citation data for publications in the publication list. The method further includes providing a user access to the publication list over a computer network and through a word processing application on the condition that the user has permission to access the publication list. The method still further includes embedding a reference to the publication lists in an electronic document containing a bibliographic citation to a publications on the publication list.

In another aspect, an apparatus for processing citations within a document includes a citation list module, a citation insertion module, and a citation maintenance module. The citation list module is configured to provide a user access to a publication list through a word processing application. The publication list includes bibliographic citation data for each publication in the publication list. The citation insertion module is configured to insert a bibliographic citation to a selected publication in the publication list into a document displayed by the word processing application. The bibliographic citation is inserted as a non-editable text unit. The citation maintenance module is configured to automatically update the bibliographic citation within the document with an edited bibliographic citation when the bibliographic citation data for the selected publication is edited.

Yet another aspect includes a computer-based method for collaborating literature review efforts among multiple people. The method includes storing a publication library in an electronic database. The electronic database is accessible to a user via the internet. The method further includes permitting a first user to view a publication from the publication library over the internet from a first computer device and associate a first comment to a portion of the publication, the first comment being saved on the electronic database. The method yet further includes permitting a second user to view the publication and the first comment over the internet from a second computer device and associate a second comment to the first comment, the second comment being saved on the electronic database.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 9 is a screenshot illustrating another embodiment of a website presented by the publication preparation apparatus.

FIG. 10 is a screenshot illustrating another embodiment of a website presented by the publication preparation apparatus.

FIG. 11 is a screenshot illustrating another embodiment of a website presented by the publication preparation apparatus.

FIG. 16 is a screenshot illustrating another embodiment of a website presented by the publication preparation apparatus.

FIG. 17 is a screenshot illustrating another embodiment of a website presented by the publication preparation apparatus.

FIG. 21 is a screenshots illustrating another embodiment of a word processing application and plug-in presented by a word processing apparatus and a publication citation module, respectively.

DETAILED DESCRIPTION

Figure 1:
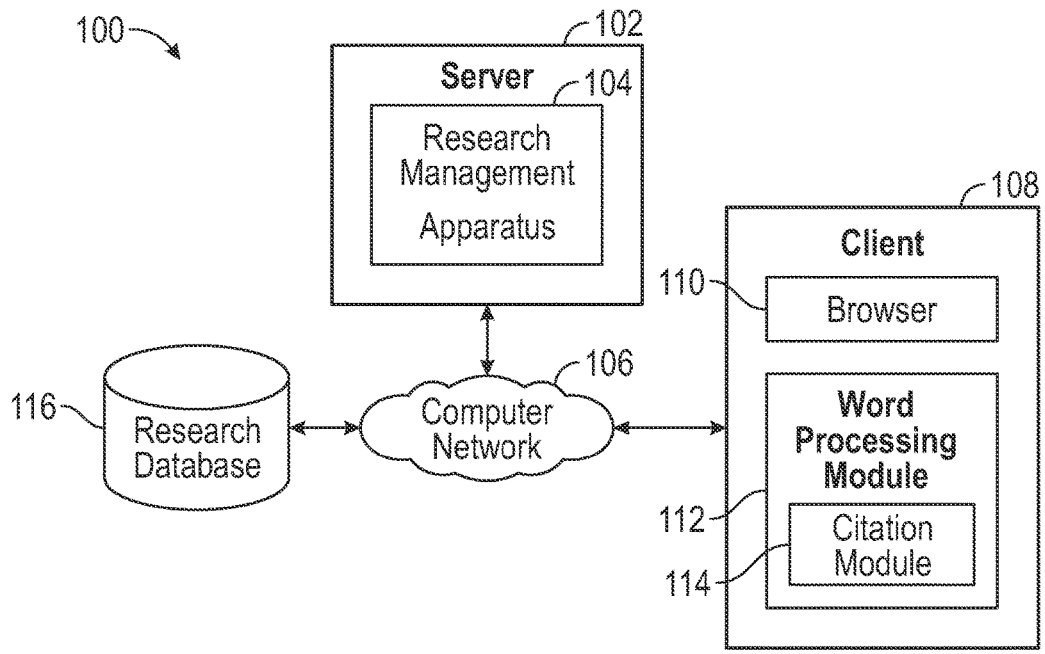
FIG. 1 is a schematic block diagram illustrating one embodiment of a system for facilitating publication preparation.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. In one embodiment, the program code may be written in a combination of languages including Angular JS, Node JS, JavaScript, D3 and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model. The computer program product may be stored on a shared file system accessible from one or more servers.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 depicts one embodiment of a system 100 for facilitating publication preparation efforts by a single user or among a plurality of users. In the depicted embodiment a system 100 for facilitating publication preparation efforts includes a research management apparatus 104 operating on a server 102, as well as a computer network 106, a browser 110 operating on a client 108, and a research database 116, as described below.

In general, the system 100 facilitates one or more of the following publication preparation efforts: research efforts, importing and uploading publications to a database or library, literature review, social commenting on other's literature review efforts, writing a document, adding bibliographic citations to a document, managing bibliographic citations into a document, sharing the document and the list of publications cited in the document, and the social collaboration of each of one or more of these steps. In one embodiment, the system 100 includes a network-based (e.g., cloud-based) research management apparatus 104 stored on the server 102, which permits a group of users (e.g., student researchers, university professors, government researchers, other academic/research personnel) to collaborate their efforts in researching, literature review, and document writing efforts. In another embodiment, the system 100 includes a citation module 114, which may be a plug-in into a word processing module 112 or other document rendering module. The citation module 114 can allow users of the system 100 to access their research, notes, full-text versions of publications in their publication library, and other information from the research management apparatus 104 for use when drafting the new publication. The research management apparatus 104 is described in more detail below with regard to FIG. 2.

In the depicted embodiment, the research management apparatus 104 operates on a server 102. In another embodiment, the research management apparatus 104 may operate on a plurality of servers 102. In various embodiments, a server 104 may include a mainframe computer, a blade server, a workstation, a desktop or other computer, or the like. Many different types of servers 102 will be clear, in light of this disclosure, that may be suitable for operating a research management apparatus 104.

In the depicted embodiment, the server 102 and the client 108 communicate via a computer network 106. In one embodiment, the computer network 106 may be a single network. In another embodiment, the computer network 106 may include several networks linked together. In various embodiments, the computer network 106 may include various network types, such as a local area network ("LAN"), wide area network ("WAN"), wireless network, or the like, as well as combinations of network types. In a certain embodiment, the computer network 106 may be a public network such as the internet. In another embodiment, the computer network 106 may be a virtual private network operating over a public network. In yet another embodiment, the computer network 106 may be a private network, such as a corporate intranet.

In one embodiment, the computer network 106 may include hardware such as the server 102, routers, switches, cabling, and other communication hardware. In light of this disclosure, many types of computer network 106, and components of a computer network 106, are clear.

In the depicted embodiment, the system 100 includes a client 108. In one embodiment, a user accesses the research management apparatus 104 by using the client 108 to communicate with the server 102 over the computer network 106. In various embodiments, the client 108 may be a desktop computer, a laptop computer, a tablet, a mobile phone, smart watch, smart glasses, smart TV, or the like. Although only one client 108 is shown in FIG. 1, the system 100, in a further embodiment, may include multiple clients 108. For example, in one embodiment, multiple people within a university, business, or other organization may use multiple clients 108 connected to the computer network 106 in order to access the research management apparatus 104. In a further embodiment, a single user may use multiple clients 108. For example, a user may access the research management apparatus 104 using a laptop computer as a client 108 as well as when and using a mobile phone as a client 108. In light of this disclosure, it is clear that many types of devices are suitable for use as a client 108.

In the depicted embodiment, a browser 110 operates on the client 108, and the user interacts with the research management apparatus 104 via the browser 110 to transfer information and to display information. In one embodiment, the browser 110 may be a general-purpose application for displaying web pages, and the research management apparatus 104 may present information to the user in a web page a series of web pages displayed by the browser 110. In another embodiment, however, the browser 110 may be a specific-purpose application (e.g., an "app") for use with the research management apparatus 104, and the research management apparatus 104 may present information to the user in another form, instead of as a web page.

Although the above-disclosed browsers 110 display information in visual form, other types of browsers 110 may be used in other embodiments, to present information in non-visual form. For example, a browser 110 for a blind person may include a screen reader, which audibly reads information from the research management apparatus 104 instead of, or in addition to displaying it on a screen. For simplicity, the word "display" is used herein to refer to the presentation of information in visual form, and the term "present" refers to presentations in visual and non-visual forms.

In an embodiment, the browser 110 includes an image plug-in (not shown). The image plug-in can be configured to import images displayed on the browser 110 into the research management apparatus 104. The image plug-in can be configured to copy the image, take a screen capture/screenshot of the image, or download a copy of an image on a website. The image plug-in can further be configured to import the selected image into the research management apparatus 104, as described below. In an embodiment, the image plug-in can be configured to prompt the user to insert information about the selected image, such as a name, tag, description, etc. This information can be associated with the image in the research management apparatus 104.

In one embodiment, the research management apparatus 104 is provided through the server 102 over the network 106 in a manner that enables platform-mediated data sharing among applications, for example, in a software-as-a-service (SaaS) platform. SaaS refers to providing the use of software as a service on demand, for instance, by subscription, e.g., in a "pay-as-you-go" model. A customer or a user subscribes for the use of a software application, for instance, as needed by the customer. The software application, such as the research management apparatus 104, is provided as a service through a remote platform (e.g., the server 102) that a customer may access via a network 106 (e.g., the Internet) from a browser 110 on a client 108. In embodiments where services of the research management apparatus 104 are provided as SaaS, a group of users of the software can work collaboratively work from multiple remote locations on the various research, literature review, and/or writing efforts involved in the preparation of an academic paper or other such publication.

In the depicted embodiment, the system includes a client 108 that includes a word processing module 112. In one embodiment, the word processing module 112 is a word processing application used to draft text and mixed-media documents. Non-limiting examples of a word processing module 112 include downloadable word processer applications, such as Microsoft Word™, Microsoft FrontPage™, Microsoft Publisher™, OpenOffice.org Writer, LibreOffice, AbiWord, Calligra Words by KDE, LyX, Pages from Apple, Inc, and various other such software applications. In other embodiments, the word processing module 112 may include web-based or cloud-based word processor application that is accessed over a computer network 106 through the browser 110 of the client 108. In other embodiments, other forms of document rendering applications may be used in place of a word processing module 112.

The word processing module 112 can include a citation module 114. In some embodiments, the citation module 114 is a plug-in or other suitable software component that provides additional, custom functionality to the word processing module 112. The citation module 114 may include one or more graphical toolbar or sidebar elements and menu commands that permit a user to interface with the research management apparatus 104. For example, FIGS. 18 through 23 depict an embodiment of a plug-in and user interface of this plug-in. The citation module 114 can include tools and functions for working with a document, including tools for adding a bibliographic citation into a document. Additionally, the citation module 114 can include tools and functions for accessing the research management apparatus 104 through the computer network 106, viewing publications stored on the research management apparatus 104, accessing a publication library and/or list, viewing and modifying literature review marks made to the publications, viewing and modifying group information from the publication preparation apparatus, and/or viewing and modifying project information from the research management apparatus 104. Thus, in one embodiment, the citation module 114 provides to the user, either natively or via the network/cloud-based research management apparatus 104, all or many of the features of the research management apparatus 104. The citation module 114 is described in more detail below with regard to FIG. 4.

In addition to a word processing module 112 and a citation module 114, embodiments of the client 108 can include a spreadsheet module (not shown). In one embodiment, the spreadsheet module is a software application used to organize and analyze data in tabular form. Non-limiting examples of a spreadsheet module include downloadable spreadsheet applications, such as Microsoft Excel™, Microsoft FrontPage™, Gnumeric, OpenOffice.org Calc, LibreOffice Calc, Numbers™ from Apple, Inc, and various other such applications. In other embodiments, the spreadsheet module may include web-based or cloud-based spreadsheet application that is accessed over a computer network 106 through the browser 110 of the client 108.

The spreadsheet module can include a linking module (not shown). In some embodiments, the linking module can be a plug-in or other suitable software component that has additional, custom functionality to the spreadsheet application. The linking module may include one or more graphical toolbar or sidebar elements and menu commands that permit a user to interface with the research management apparatus 104 via the computer network 106. The linking module can include tools and functions for accessing the research management apparatus 104 through the computer network 106, viewing publications stored on the research management apparatus 104, viewing and modifying literature review marks made to the publications, viewing and modifying group information from the research management apparatus 104, and viewing and modifying project information from the research management apparatus 104. Thus, in one embodiment, the linking module provides to the user, either natively or via the research management apparatus 104, all or many of the features of the research management apparatus 104. The linking module is described in more detail below with regard to FIG. 5.

The above description of a server-client architecture for the system 100 is intended as illustrative, and not limiting.

In other embodiments, a system 100 for publication preparation may have different architectures. For example, in one embodiment, the research management apparatus 104 may be a local application for one user, and the system 100 may include one computer, without a computer network 106. In another embodiment, a system 100 including the research management apparatus 104 may include a peer-to-peer architecture. Many types of system architectures that allow a research management apparatus 104 to operate and to interact with a user, or users, are clear in light of this disclosure.

As further shown in FIG. 1, in some embodiments, the system 100 includes a research database 116. In these embodiments, the research management apparatus 104 can be configured to access a research database 116 via the computer network 106. The research database 116 can be an online library service that stores electronic versions of publications, such as academic publications, medical publications, legal publications, corporate publications, books, and the like. The research database 116 stores publications, which are previously-published documents, rather than draft documents that are in the process of being prepared for publication or other submission. Non-limiting examples of research database 116 include the EBSCO (Elton B Stephenson Company) online database, JSTOR, ProQuest, Web of Science, PubMed, LexisNexis, Westlaw, Library of Congress, Web of Knowledge, National Library of Medicine, CrossRef, BIOSIS, Dialog, Library OPACS, Medline, Ovid, WilsonWeb Online, Vision Science Reference Database, Agricultural and Veterinary Information, Google Scholar, and many others. In one embodiment, the system 100 includes multiple research databases 116. In some instances, at least one of the research database 116 is a subscription-based database that requires a user to subscribe to the database and/or pay a fee for access to the database before the database can be searched. In some instances, two, three, four or more of the research database 116 are subscription-based databases. In such instances, the research management apparatus 104 can be configured to search through multiple subscription-based research databases 116. Moreover, the research management apparatus 104 can be configured to search through multiple subscription-based research databases 116 based on a single search from a user of the research management apparatus 104. This multi-database search ability can reduce the need for a user to individually search through separate databases through each database's website using the same or similar search queries.

In an embodiment, the browser 110 includes a publication import plug-in (not shown). The publication import plug-in can be configured to import a publication presented on the browser into the research management apparatus 104. For example, if a user is opening a browser to a publication in a research database 116, the publication import plug-in can be configured to import a copy of that publication along with any bibliographic citation information associated with that publication and/or any notes associated with that publication. The publication import plug-in can be website specific, such as being specific to a single research database (e.g., the EBSCO database) or it can be generally configured to be useful in multiple research databases 116.

Figure 2:
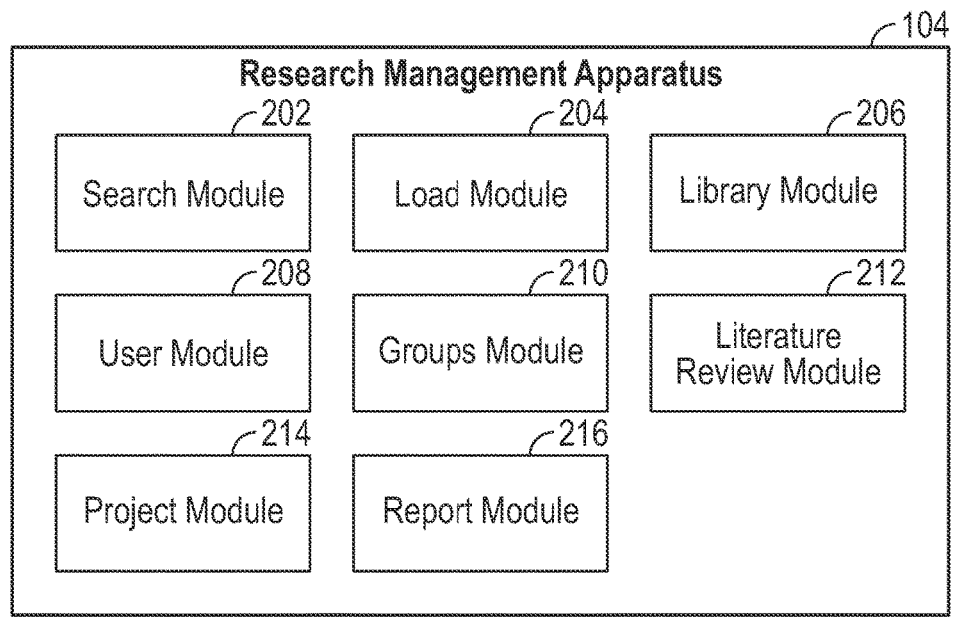
FIG. 2 is a schematic block diagram illustrating one embodiment of a publication preparation apparatus.

FIG. 2 depicts one embodiment of a research management apparatus 104. The research management apparatus 104 may be substantially similar to the research management apparatus 104 described above with regard to FIG. 1. In general, as described above, the research management apparatus 104 facilitates one or more of the following efforts: researching, document searching, publication importing/uploading, literature review, publication categorization, creation of publication libraries/lists, publication storage, publication highlighting and commenting, social commenting and other literature review actions of others, searching for and within stored publications, new document preparation, and/or the social collaboration of each of one or more of these steps.

In the depicted embodiment, the research management apparatus 104 includes a search module 202, a load module 204, a library module 206, a user module 208, a groups module 210, a literature review module 212, a project module 214, a report module 216. In certain embodiments, one or more of these modules may be omitted. For instance, the search module 202, the project module 214, the groups module 210, and/or the report module 216 may be omitted. For example, in one embodiment, the research management apparatus 104 may include the load module 204, the literature review module 212, the groups module 210, and the library module 206 but may omit the search module 202 and the project module 214. Each of these modules will now be described in greater detail.

In an embodiment, the search module 202 is configured to provide search engine capabilities to the research management apparatus 104. The search module 202 can be configured to electronically search for publications stored in one or more research databases 116, such as those listed above. For example, the search module 202 can advantageously allow a user to search for publications on external databases, such as a subscription-based and/or publically-available research database 116. Moreover, the search module 202 can import publications into the research management apparatus 104 and/or import or automatically identify a bibliographic citation for the imported publication.

As previously mentioned, a disciplined researchers are often required to search through multiple separate databases to ensure that they have identified all relevant publications on their topic of interest. To gain a complete understand of the state of knowledge on a given topic, researchers may be required to search through largely redundant databases to identify any unique works published in each database. This step may identify tens or even hundreds of publications discussing a topic of interest.

To remove at least some of the difficulties and redundancies involved in publication searching, in some embodiments, the search module 202 can be configured to permit a user to simultaneously search multiple databases using a single search function native to the search module 202. Moreover, in some embodiments, the search module 202 can simultaneously search one or more subscription-based databases using the single search function. For example, the search module 202 may permit a user to search two or more of the EBSCO, JSTOR, and ProQuest and research databases 116 using a single search query.

In one embodiment, the search module 202 is configured to receive login information from a user for each subscription-based database. The search module 202 can be configured to automatically login to each subscription-based database 116 and transmit the user's submitted search query from the search module 202 of the research management apparatus 104 to one or more remote research databases 116. In an embodiment where the search module 202 is configured to search at least one subscription-based database, the search module 202 can transmit access information (e.g., login information) to each subscription-based database along with the search query. After a search query is submitted by the search module 202 to each of the one or more research databases 116, the research databases can perform a search based on the search query received from the search module 202. Results from the search query are returned from each of the one or more research database 116 to the search module 202 of the research management apparatus 104 over the computer network 106. The search module 202 can then be configured to display a combined list of search results to the user (e.g., via the browser 110) with results from the multiple research databases 116 that were searched.

Results received from two or more research databases 116 can be displayed to the user simultaneously. In one embodiment, the search results are segregated, keeping results returned from one database 116 separate from results from another database 116. In another embodiment, the search results are combined together and presented to the user as a single set of search results. In embodiments employing a combined set of search results, the search module 202 can be configured to identify and combine duplicate results identified from separate search databases 116. For example, if Publication X was returned from two separate databases 116, the search module 202 can identify that two search results include Publication X and can display only one results for Publication X, rather than two.

The search module 202 can include a plurality of search, filter, and analysis functions that may be employed by the user to search through and analyze search results. Non-limiting examples of such functions include filtering search results by title, author, publication year, publication source (e.g., specific journal, etc.), source research database 116, and more. Other examples include narrowing the search by adding search terms. Moreover, the search module 202 can employ one or more analysis functions to analyze and/or data mine the search results using a variety of analysis and data mining techniques. Results of such analysis functions can include displaying various graphs to graphically illustrate the nature of the search results to the user(s).

By searching through multiple different research databases 116, the search module 202 allows a researching user to identify the unique publications available in the searched research databases 116 and thus eliminates the need to perform separate searches on each of the different research databases 116. This ability may substantially reduce the amount of time required by researcher to identify all publications discussing a topic of interest and together a complete view of the state of knowledge about that topic. Whereas in the past the task of researching through multiple databases to gain this complete view would have taken up 10 to 20% of the time dedicated to developing a new publication, the search module 202 with its ability to simultaneously search through different research databases 116 may reduce the amount of time.

Documents identified in the research process include publications. Publications include writings previously published. Examples include books; journal articles, articles in magazines or other periodicals; manuscripts; papers presented, submitted, and published by industrial and professional societies and organizations, and other writings cited in scholarly and academic publication outlets.

In one embodiment, the search module 202 is configured to access the contents of a full-text version of a selected publication. This process may include sending a request to a research database 116, receiving an electronic copy of the selected publication, and displaying that publication to the user. In another embodiment, the search module 202 allows a user to upload a full-text copy of a publication from the research database 116 into the research management apparatus 104. The full-text copy of the publication may be in a variety of formats, including a non-editable format, such as portable document format (PDF), tagged image file format (TIFF), JPEG format, Microsoft Word™ format (DOCX), or other suitable format. For simplicity, the following description may refer solely to a PDF format, though it will be understood that publications may be imported and used within the research management apparatus 104 in other non-editable or image-based formats.

Referring still to FIG. 2, in one embodiment, the research management apparatus 104 includes a load module 204. The load module 204 can work separately or in conjunction to search module 202 to load publications into a database of the research management apparatus 104. The load module 204 can be configured to upload or import publications from a local drive of the client 108 into a database of the research management apparatus 104. For example, some users may store publications in an electronic format in a drive on the client 108. The load module 204 can be configured to upload individual files or files from a selected folder on the client 108. In embodiments where the browser 110 includes an image plug-in, the load module 204 can be configured to work in connection with the image plug-in to load images into a database of the research management apparatus 104.

In an embodiment, the load module 204 can be configured to upload and import publications from local library of the client 108. Local libraries may include library stores associated with a software application, such as an Endnote® library, RefWork® library, or Mendley™ library. For example, the load module 204 can be configured to upload and import publications from an Endnote library. In an embodiment, the load module 204 can be configured to upload and import publications from an online library associated with a user. For example, the load module 204 can be configured to upload and import publications from an online or cloud-based document storage. This may include uploading documents from a user's Google Drive™, Dropbox™ folder, iCloud™ folder, online Endnote library, and many others such databases and libraries.

In one embodiment, the load module 204 can include an optical character recognition (OCR) module (not shown). The OCR module can convert scanned or photographed images of typewritten or printed text into machine-encoded/computer-readable text. When a user uploads a scanned document into the research management apparatus 104, the load module 204 may identify whether the text is computer readable text. Accordingly, in one embodiment, the load module 204 is configured to determine whether text in a publication is computer readable text. If it is not the OCR module can convert the images of the text into computer readable text. This functionality can enable the load module 204 to load documents into a library or database in a form that is readable and selectable and which can facilitate a user's subsequent review of the publication.

In addition to importing a full-text copy of a publication, in certain embodiments, the search module 202 and/or the load module 204 can import or automatically identify a bibliographic citation and/or bibliographic citation information for the imported publication. Some research databases 116 may provide bibliographic citation information to a user. The search module 202 and/or load module 204 can be configured to export this information from the research database 116 and import it into the research management apparatus 104. When that information is not provided by the research database 116 the search module 202 can attempt to extract bibliographic citation information from the publication. This can include parsing through the publication to identify a title, author name(s), journal/book/magazine name, page number(s), publication year, and/or other such information needed to form a bibliographic citation. The imported or identified bibliographic citation can be associated with the imported publication. Additionally, in some instances, a user may choose not to upload or import a copy of a publication, but may still want a record of the publication in the publication library of the research management apparatus 104. In these instances, the research management apparatus 104 and/or the load module 204 can be configured to permit a user to create a library/list entry for publication into the publication library without adding the full-text version of the publication, but importing or manually adding bibliographic citation data for the publication into the publication library.

In one embodiment, publications imported into the research management apparatus 104 by the search module 202 and/or the load module 204 are stored in the research management apparatus 104. These publications may then be an designated as accessible by the user who imported the publications and possibly other users of a group designated by the importing user as well. In an embodiment, these publication can be stored in the library module 206 or be otherwise accessible via the library module 206. The set of publications accessible to each user can be indexed and/or stored in the library module 206. This set of publications can be referred to as the user's publication library. As mentioned, each user's library can include a plurality of publication listing, full-text versions of publications, bibliographic citation information for each publication, and information about literature review actions made on each publication (as will be discussed below). Similarly, the set of publications accessible to members of a group can be included in each members of that groups' publication libraries. Accordingly, each publication in the publication library may be associated with one or more of the full-text version of the publication, the text of an abstract of the publication, bibliographic citation information, a quick reference name or nickname for the publication (this name may be selected by the user), and/or literature review actions and social literature review actions.

In an embodiment, a user's publication library can include multiple publication lists. Each publication list can include a set of publications that the user has added to the list. For example, a user may add publications to different lists within his/her library to separate research tasks when researching for multiple papers. The user can then segregate the publications into lists, with each list representing the publications that the user has stored for a certain publication. A single publication in a user's library can be assigned to multiple lists. Furthermore, in one embodiment, if a user shares a list with another user in his/her group, not all information associated with that publication may be shared. For example, when a user shares a list, the full-text version of the publications in that list and/or other information may not be shared. The library module 206 can be configured to store, index, and/or provide access to the publications, publication information, publication lists, and publications libraries. The library module 206 can be further configured to provide the services and features described above relating to a user's and group's publication libraries.

In an embodiment, the library module 206 can be configured to store images. The library module 206 can be configured to work in conjunction with the load module 204 to the load images into the library, which may be stored on a database of the server 102. The library module 206 can be configured to store the images separately from the publications or with the publications. Accordingly, images can be stored in a publication library or in a separate image library. Both libraries can be maintained and managed by the library module 206. The library module 206 can be configured to store all types of image files, including, screen captures and screen shots. The ability to store image files can enable a user to store images and photos, graphs, charts, and the like, which can be utilized by the user when researching and writing a paper.

In an embodiment, users of the research management apparatus 104 may each be required to sign up for a user account through a user module 208. Each user account may have a separate publication library that stores the user's publications and publication information and/or has permissions to access publications stored in other user's or group's publication libraries. The user module 208 may be configured to require users to select a unique username and password in order to register and later log-in to his/her account.

Referring still to FIG. 2, the research management apparatus 104 can include a groups module 210. The groups module 210 can be configured to designate which users of the research management apparatus 104 can access which documents stored on the research management apparatus 104. The research management apparatus 104 can be configured to require users to register with the research management apparatus 104 before being permitted access to all of the functions, processes, and publications of the research management apparatus 104. In some embodiments, the research management apparatus 104 can be configured to require users to login with a unique username and password before access is granted. By requiring users to login, the research management apparatus 104 can recognize the identity of each user.

The groups module 210 can be configured to enable registered users of the publication preparation apparatus to create and join groups of users and invite other members to join a group. The groups module 210 can be configured to enable users of the group to designate one user as an administrator and/or to designate a creator of the group as the group administrator. In one embodiment, the group administrator has the ability to control access to the group and designate levels of access to the various functions of the research management apparatus 104 for each of the group members. After a user becomes part of a group, that user can share access to publications uploaded into the research management apparatus 104 by members of the group. Additionally, in certain embodiments, group members can access the public literature review actions made by other members of the group to the group's publications, can join group discussion boards, can access project information relating to projects participated in by at least some of the members of the group, and/or can access reports. Literature review actions, projects, and reports will be discussed in additional detail in relation to the description of the literature review module 212, the project module 214, and the report module 216 below.

Referring still to FIG. 2, the research management apparatus 104 can include a literature review module 212. The literature review module 212 can be configured to facilitate the individual and/or collaborative review of the publications. For example, as previously mentioned, individuals and members of a group may search, import, and upload publications into the research management apparatus 104. The literature review module 212 can then permit group members to view publications stored on the research management apparatus 104, perform one or more literature review action on the publication(s), view the literature review actions of other group members related to a publication and/or socially comment on the literature review actions of the other group members, and/or perform literature review actions that are linked to the literature review action of another group member.

As previously mentioned, the task of reviewing publications identified in a search to determine if and how each will be used in a new publication can be very labor intensive, requiring the reviewer to read through and filter each identified work. While each reviewer may review a publication differently, general steps include highlighting key text, adding comments and annotations, categorizing each publication, and determining whether each publication will be cited or quoted in a new publication. These steps are further complicated when multiple researchers are involved. Accordingly, the literature review module 212 of the research management apparatus 104 is configured to simplify and manages the task of collaborating the research and literature review efforts of multiple users. As previously noted, search results can easily be shared between members of a group through the research management apparatus 104. The literature review module 212 may further simplify and manage this process by enabling group members to divide up literature review tasks, and then easily review the literature review actions of other members. The literature review module 212 is described in more detail below with regard to FIG. 3.

Referring still to FIG. 2, the research management apparatus 104 can include a project module 214. The project module 104 can provide a workflow management platform for members of a group. The project module 214 can include a task list, checklist, a message center, and the like. The project module 214, can further enable social commenting on these features, so the members of the group can comment on tasks, checklist items, and messages.

In the depicted embodiment, the research management apparatus 104 can include a report module 216. The report module 216 can be configured to provide reports to a user or group of users regarding the status of a research, literature review, and/or writing project.

In an embodiment, the research management apparatus 104 can include an image module (not shown). The image module can be configured to store, access, and provide a library of images for a user. In certain embodiments, the image module is configured to work in conjunction with the library module 206, the load module 204, and/or the literature review module 212 to load images, provide a user access to images, and enable literature review and social literature review of the images.

Figure 3:
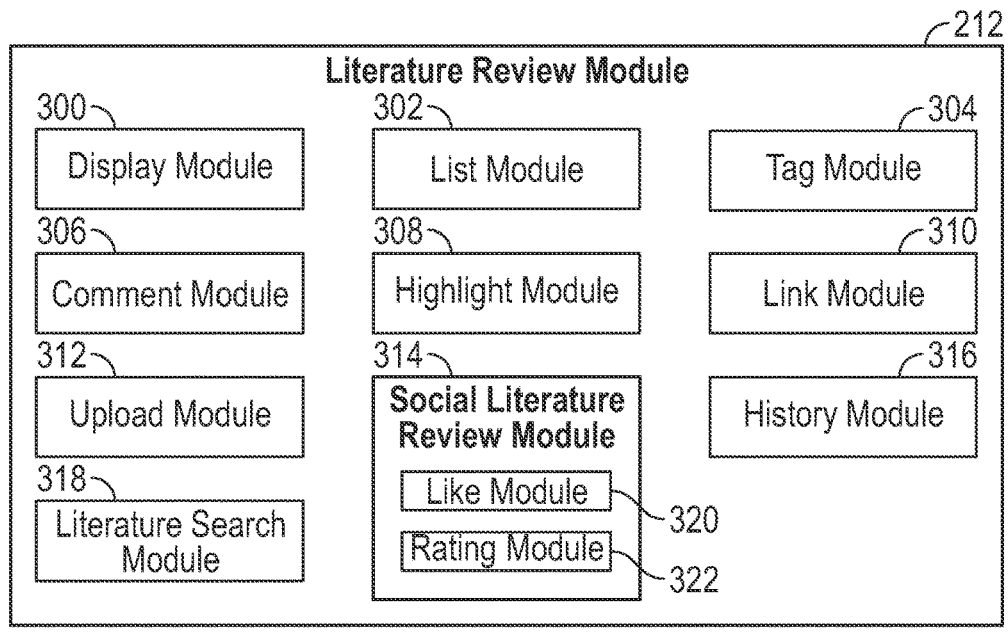
FIG. 3 is a schematic block diagram illustrating one embodiment of a literature review module.

Reference will now be made to FIG. 3, which depict an embodiment of a literature review module 212. The literature review module 212, in certain embodiments, is substantially similar to the literature review module 212 described above with regard to FIG. 2. In the depicted embodiment, the literature review module 212 includes a display module 300, a list module 302, a tag module 304, a comment module 306, a highlight module 308, a link module 310, an upload module 312, a social literature review module 314, a history module 316, and a literature search module 318. Additionally, the social literature review module 314 is depicted as having a like module 320 and a rating module 322. Some embodiments of the literature review module 212 may include some, but not all of these modules. Each of these modules will now be described.

In one embodiment, the literature review module 212 is configured to allow a user to perform one or more literature review actions on publications stored in the research management apparatus 104. Literature review actions include at least attaching a comment to a publication or a proportion of a publication, highlighting text within a publication, attaching a hyperlink to a publication or a proportion of a publication, categorizing the publication into one or more categories, and adding a tag to a publication or a portion of the publication. Additionally, in an embodiment, the literature review module 212 is configured to allow a user to perform one or more social literature review actions on a previously-made literature review action. Social literature review actions are literature review actions linked to or attached to another literature review action. Social literature review actions enable the group to cooperate together in reviewing the publications shared by the group. For example, a group member reviewing a publication may highlight text in the publication, link a comment to the highlighted text, and add a tag to the highlighted text. The highlighting, the comment, and the tag are literature review actions. Continuing the example, another group member reviewing the same publication may add a comment to the first user's comment and may suggest an alternative tag. This comment on a comment and the alteration tag suggestion are social literature review actions. Accordingly, in one embodiment, the literature review module 212 enables social literature review. Social literature review involves a second user performing a literature review action on the literature review action of a first user or to link a literature review action to the literature review action of the first user.

One particular social literature review action is social commenting. When a first user reviews a publication he/she may make a comment on the publication as a whole or on a specific portion of the publication. A second user, who is in a group with the first user, may later review the same publication along with the first user's comment. The second user may add a comment to the first user's comment. This add-on comment is referred to herein as a social comment, and the action of adding on the second comment is referred to herein as social comment. In addition to social commenting on the first user's comment, the second user can also attach/link a document to the first user's comment, "like" the first user's comment, or rate the first user's comment. Each of these social literature review actions performed by the second user on user on the comment of the first user are referred to herein as social comment review actions.

As mentioned, when researching the information published about a specific topic or idea, researcher may identify dozens or even hundreds of previously published works. These researchers are then left with the task of review each publication to determine if and how each will be used in a new publication. This step is complicated when multiple individuals are involved, which is frequently the case in university-level academic research. Each additional individual adds difficulty to the task of collaborating the review of the identified publications. For example, historically each reviewer may have reviewed a publication differently with some reviewers keeping notes in a spreadsheet document while others print out physical copies that they manually highlight and on which they write notes.

As will be understood, the literature review module 212 may unify the efforts of multiple reviewers by providing a single publication library that can be accessed by multiple users of a group (e.g., a research team) and reviewed through a user interface. This user interface can permit each member of the group to access the publications stored to the literature review module 212 by members of the group, and track and save literature review actions made by each member of the group on the publications. Additionally, the literature review module 212 can permit members of the group to socially comment on other literature review actions of other members. As such, in some instances, the literature review module 212 facilitates the social collaboration of the literature review process and provides a forum for social commenting and review of each publication.

As depicted in FIG. 3, in one embodiment, the literature review module 212 includes a display module 300. The display module 300 can be configured to display a publication to a user via one or more user interfaces. As mentioned, the publication and be in a non-editable format, such as a PDF format, or an image format. In a certain embodiment, the display module 300 includes a PDF viewer or other suitable document viewer application that permits a user to open, view, and scroll through a PDF version of a publication document. Additionally or alternatively, the display module 300 can be configured to open other document formats. The display module 300 may further be configured to display a user interface through which a user can navigate through and access the various features of the literature review module 212. In some embodiment, the display module 300 is configured to display images stored in a user's publication library. The display module 300 can include an image display sub-module (not shown) for opening image files. Alternatively, a separate image display module (not shown) can be configured to open image files.

Referring still to FIG. 3, in one embodiment, the literature review module 212 includes a list module 302. The list module 302 is configured to assign each publication into one publication lists, as previously discussed with reference to the library module 206 of FIG. 2. For example, the list module 302 may permit a user to create one or more custom lists and then assign a publication to one or more of those lists. For example, a user may create a list called "irrelevant" designed for publications that are not relevant to the user's research interest. Similarly, a user may create a list called "key publication" designed for publications the user feels are key to his or her research interest. Additionally, a user may create lists that relate to topics of the user's research interest. In one embodiment, the list module 302 may suggest lists or may provide a set of default lists. The list module 302 may cooperate with or provide a user interface that presents to the user the set of lists available to the user during the literature review process. When the user as part of a group, the user may be provided access to the public lists created by other members of the group. This access may allow the group members to collaborate in the process of sorting out and categorizing a group of publications. The list module 302 can permit a user to designate a list as either public or private, with public categorizations being available and visible to other members of the users group and private categorizations being available and visible only to that user.

In one embodiment, the literature review module 212 includes a tag module 304. Similar to the list module 302, the tag module 304 can permit a user to categorize a publication with one or more categorizations, or tags. Additionally, the tag module 304 can permit a user to categorize selected portions of text or other content within a publication. In a certain embodiment, the tag module 304 adds a categorization, selected by the user, to selected content within a publication. For example, a user may highlight a paragraph or chart within a publication and add a tag to the content. As with the list module 302, the tag module 304 can be configured to permit users to create custom tags that are used by the user and/or shared by other members of the user's group. The tag module 304 can also provide default tags. In an embodiment, the tag module 304 provides or is associated with a user interface in which the user is presented with a list tags. Additionally, the user interface can permit the user to select a tag and in response be presented with able list of all content categorized under that tag. Alternatively, the user may be provided with links to each instance of tagged content or a preview or other representation of each instance of the tagged content. Accordingly, the tag module 304 can facilitate the literature review process by enabling a user or group of users to categorize and visualize publications and or portions of publications from my library of publications. This ability can allow the user or group of users to more easily visualize the current state of knowledge on a particular topic of interest.

In an embodiment, the literature review module 212 includes a comment module 306. The comment module 306 can cooperate with the display module 300 to enable a user to add a comment to a publication or a portion of a publication shown through the display module 300. Comments refer to include user-created/added text, hyperlinks, and/or images attached to a publication or a specific portion of a publication. Thus, while a user is reviewing a publication, the user can insert a comment into a portion of the publication. The comment can be linked to a certain location of the publication or to a set of text or other content within the publication. In a certain embodiment, the comment module 306 cooperates with the tag module 304 to permit a user to add a tag to a comment. The comment module 306 can cooperate with a user interface that displays a publication to a user.

In an embodiment, the literature review module 212 includes a highlight module 308. The highlight module 308 can cooperate with the display module 300 to enable a user to add highlighting to a publication or a portion of a publication shown through the display module 300. The highlight module 308 can provide a user with multiple highlighting colors and styles (e.g., solid highlighting or underlining) to choose from. Alternatively, the highlight module 308 can assign each user of the group a designated highlighting color so that group members can distinguish the highlighting from other members of a group in a publication. The highlighting module 308 can also allow a user or a group to change various aspects of the highlighting settings.

In an embodiment, the literature review module 212 includes a link module 310. The link module 310 can enable a user to link a document to a comment. The linked document may be a document from the reviewing user's publication library, and to which a hyperlink is added to the comment. Moreover, the link module 310 can be configured to permit a user to choose to add a link to a document from an online database. For example, the link module 310 be configured to permit a user to link to one or more documents to from Dropbox™, Google Drive™, iCloud™, or another cloud-based database. Similarly, the link module can be configured to permit a user to choose to add a link to a document from a local drive or from the publication library of the literature review module 212. The link module 310 can be configured to create a link to the selected document. Furthermore, the link module 310 can be configured to permit a user to link to a portion of a document. For example, the link module 310 can permit a user to add a link at a selected portion of a publication to another select portion of a separate publication. In a certain embodiment, the link module 310 cooperate with the comment module 306 to insert a hyperlink as a comment, such as in a comment box, within a publication. This ability can help reviewers tie concepts together between separate publications and more completely and easily navigate between and understand the publications and what they discuss.

In an embodiment, the literature review module 212 includes an upload module 312. The upload module 312 can enable a user to upload a document into a comment. As with the link module 310, the upload module 312 can be configured to upload a document from a cloud-based database or from a local drive. For example, the link module 310 be configured to permit a user to select one or more documents to upload from Dropbox™, Google Drive™, iCloud™, another cloud-based database, or from a local drive of the client 108. In a certain embodiment, the upload module 312 cooperates with the comment module 306 and uploads a document into a comment, such as a comment box, within a publication. This ability can allow a reviewer to tie to publications together, by adding a second into a comment within the first document. In some embodiments of the upload module 312, the upload module 312 is technically configured to upload documents to the literature review module 212, such as within the publication library of the literature review module 212, and provide a link to or pointer to the uploaded document within the comment.

The literature review module 212 can include social literature review module 314. The social literature review module 314 is configured to enable social commenting and/or social literature review actions. As previously noted, social literature review actions are literature review actions linked to or attached to another literature review action. The social literature review module 314 can be configured to work with one or more of the other modules of the literature review module 212 to link or attach or otherwise add social literature review actions to other literature review actions. For example, the social literature review module 308 can be configured to add a comment to another comment, a comment to a link or upload, a comment to a tag or list categorization, or a comment to highlighting. In another example, the social literature review module can be configured to add a link to a document or to upload a document to a comment, highlighting, tag, or categorization of another.

In a certain embodiment, the social literature review module 314 can include one or more sub-modules configured to permit a user to perform additional social literature review actions. For example, the social literature review module 314 can include a like module 320 configured to permit a user to like or dislike a literature review action of another user. The social literature review module 314 can additionally or alternatively include a rating module 320 configured to permit a user to rate a literature review action a literature review action of another user. Ratings can include a sliding scale, a two-tier, three-tier, or five-tier rating scale. Other suitable rating standards can also be used by the rating module 322.

Referring still to FIG. 3, in an embodiment, each of the previously-mentioned modules of the literature review module 212 can be configured to permit each user to designate the literature review action performed by that module has either public or private. Public literature review actions may be designated as being visible to selected members of the user's group or to the entire group, while private literature review actions may be visible only to the user that perform that literature review action.

In an embodiment, the literature review module 212 includes a history module 316. The history module 216 is configured to track and/or display the literature review actions and social literature review actions of a user and/or users of a group. For example, in a certain embodiment, the history module 216 is configured to keep and display a log that tracks and correlates information related to each literature review action and social literature review action, such as the username, the type of literature review action, the date and time of the literature review action, and/or details of the literature review action. The ability to store and view actions performed by a user and other group members can assist the group to track one another's actions and more easily double check the work of others. In an embodiment, the history module 216 is configured to display a filtered set of history data based on custom filters or selected filters of the user. This feature can enable a user to view all actions performed by a selected user or users or to view a certain type of action or to view actions performed at a certain time. Moreover, the history module 216 can be configured to permit a user to select historical actions and undo those actions.

In an embodiment, the literature review module 212 includes a literature search module 318. For example the literature search module 218 can be configured to permit the user to search through the content of publications in a single publication, publication list, or publication library. In another example, the literature search module 218 can additionally or alternatively be configured to filter through literature review actions, such as within the text of comments. Searches may be filtered by user-selected tags and/or publication lists. When publications include computer readable text, the literature search module 318 can be configured to search the text of a publication. Additionally or alternatively, the literature search module 318 can be configured to search only highlighted text or text that includes some other form of literature review action. Moreover, the literature search module 218 can be configured to search publication titles, authors, publisher information, publication year, and the like. Moreover, the literature search module to a teammate be configured to sort search results by relevancy, including whether searched terms are highlighted in a publication or whether search terms were included in a tag or category of the publication. In certain embodiments, the literature search module 318 to be configured to search through the content of the project module 214 and/or the report module 216.

Figure 4:
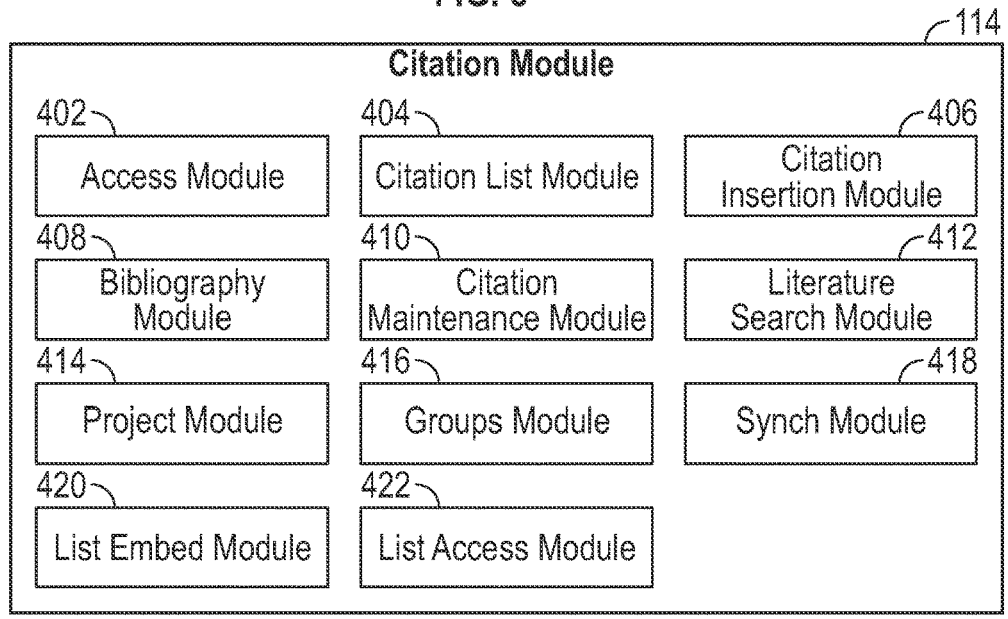
FIG. 4 is a schematic block diagram illustrating one embodiment of a publication citation module.

Reference will now be made to FIG. 4, which depicts an embodiment of a citation module 114. The citation module 114 can be substantially similar to the citation module 114 described above with regard to FIG. 1. Specifically, in some embodiments, the citation module 114 can be a plug-in or other suitable software component that provides additional, custom functionality to the word processing module 112. Moreover, the citation module 114 can be configured to access the research management apparatus 104 via a computer network 106 and sever 102.

Alternatively, the citation module 114 can be configured to operate independently from an online or network-based publication library. For example, the citation module 114 can access a publication library stored on the client 108 or inserted and accessed solely through the citation module 114. In yet another alternative embodiment, the citation module 114 is configured to access an online or online or network-based research management apparatus that offers a limited offering of tools/features, such as only a publication library and/or literature review feature. Accordingly, in some embodiments, the research management apparatus 104 has only one or more of a load module 204, a library module 206, and a literature review module 212.

In the depicted embodiment, the publication citation module 114 includes an access module 402, a citation list module 404, a citation insertion module 406, citation maintenance module 408, a bibliography module 410, a search module 412, a projects module 414, a groups module 416, a synch module 418, a list embed module 420, and a list access module 422. In certain embodiments, one or more of these module may be omitted from the citation module 114. Each of these modules will be described below.

In one embodiment, the citation module 114 is configured to facilitate the insertion of citations within an editable document of the word processing module 112. The citation module 114 can be configured provide a user with access to information available in the research management apparatus 104 through the word processing module 112. In an embodiment, the citation module 114 is configured to allow a user to easily insert a bibliographic citation referencing a publication and which is in the user's publication library of the research management apparatus 104 into an editable document of the word processing module 112. The citation module 114 can also be configured to facilitate the creation of or create a bibliography within the document, and/or track and maintain the integrity of the citations and bibliography within the editable document. Such features may substantially facilitate the process of preparing a paper for publication by a single individual or a group working collaboratively.

In one embodiment, the citation module 114 includes an access module 402. The access module 402 can be configured to access the research management apparatus 104, which may be stored on an online location, via the computer network 106. The access module 402 can access and import and/or upload data into the publication citation module 402 from the research management apparatus 104 to the citation module 114, over a computer network 106. In one embodiment, the access module 402 prompts a user to enter the user's login information for the research management apparatus 104. The access module 402 can securely transmit this information to the research management apparatus 104 to access information from the user's publication library. After a user has logged in, the access module 402 can import information from the research management apparatus 104 into the citation module 114. In some embodiments, the access module 402 works with the synch module 418 to synch changes made to information received from the research management apparatus 104 in the citation module 114. The access module can also be configured to open a browser 110 on the client 108 that accesses the research management apparatus 104 upon command from the user or under certain conditions.

In one embodiment, the citation module 114 includes a citation list module 404. The citation list module 404 can be configured to provide a user access to a publication list through a word processing application. For example, the citation list module 404 can be configured to display and/or access one or more publication lists from the user's publication library, which can be a local or cloud-based library. In certain embodiments, the citation list module 404 can be configured to display a publication list associated with an editable document, as discussed below. The displayed list of publications can display a title, publication year, author(s), or other suitable information to represent a given publication of the publication library. This list and the information presented in the list can be populated from the user's publication library on the research management apparatus 104, via the access module 402. In an embodiment, the citation list module 404 is configured to display the number of times that publication has been cited within the editable document, the number of comments and social comments within each publication, the name of the publication list, tags associated with each publication, and/or the number of highlights within each publication. Additionally, in certain embodiments, the citation list module 404 is configured to display detailed information about a publication when the publication is selected, such as when a user's cursor hovers over the name of the publication or when a cursor selects the name of the publication (e.g., via a mouse click or tap of a touch pad). In an embodiment, the citation list module 404 allows a user to edit, delete, or add information about a publication. The citation list module 404 can be configured to display and/or include a hyperlink along with the information about a publication. When the hyperlink is selected, the citation list module 404 is configured to trigger the access module 402 to open a browser 110 to the research management apparatus 104 and specifically to a page displaying the full-text version of the selected publication, if available.

In one embodiment, the citation list module 404 is configured to display accurate bibliography citation information for publications within the user's publication library. This information may be accessed by the access module 404 and changes made to this information may be synched with the publication library via the synch module 418. This information can be used to create and insert a bibliographic citation for the publication into a document opened in the word processing module 112. The citation list module 404 can also be configured to add a publication to the user's publication library by receiving from the user data associated with the new publication. This data may include bibliographic citation information or a nickname or temporary name for the publication. For example, when writing a paper, the user may want to add a bibliographic citation to a publication that is not in the user's publication library. The user can then add information about this publication, using the citation list module 404, and insert a bibliographic citation into the paper. If the user does not have complete bibliographic citation information for the publication the user can insert basic information including a nickname for the publication. As will be described below, if the user can later update the bibliographic citation information about the publication, using the citation list module 404, and all bibliographic citation references within the paper can be automatically updated by the citation maintenance module 408.

In one embodiment, the citation module 114 includes a citation insertion module 406. The citation insertion module 406 can be configured insert a bibliographic citation to a selected publication in the publication list into a document displayed by the word processing application. For example, a user may select a publication from the publication list and then select a command that triggers the citation insertion module 406 to insert a bibliographic citation into the paper at the current location within the paper. The citation module 114 can be configured to format the citation based on a selected formatting requirements or citations. In one embodiment, the citation module 114 to permit a user to select a formatting requirements based on a list of preconfigured citation format options. Non-limiting examples of citation formats include APA, MLA, ASA, ACS, Chicago, Turabian, Sciences, and BlueBook. Additionally, the citation module 114 can be configured to permit the user to create a custom citation format.

In an embodiment, the citation insertion module 406 is configured to insert each bibliographic citation as a non-editable text unit, which cannot be edited within the document itself, only deleted. The bibliographic citation can only be updated by editing the bibliographic citation data for the cited publication with the citation list module 404 of the citation module 114, as previously described. For example, a use may select a command to insert a citation into Publication A through the citation module 114. In response to this user command, the citation module 114 may insert a bibliographic citation for Publication A into a document displayed by the word processing application. The bibliographic citation may be inserted at the location of a cursor within the document and may be inserted as a non-editable text unit, such as "Smith, John. "Guide to Writing." *Publisher Press,* 2014, 21." While this bibliographic citation includes a number of characters, words, and punctuation marks, these cannot be edited through the word processing application 112, only through the citation module 114. For example, if the user identifies that the name of the author is not "John Smith," but "James Smith," the user cannot move the curse to the name "John," delete that name, and replace it with "James" because the text of the bibliographic citation is not identified by the word processing application as a series of separate characters and symbols, but as a single non-editable text unit. To change the text of the bibliographic citation, the user would be required to change the citation data relating to this publication in the publication list. Thereafter, the citation module 114 would update the text of the bibliographic citation within the document to replace the name "John" with "James." This feature can preserve the integrity of each inserted citation and prevent various errors that might arise if a user is able to intentionally or unintentionally edit the text of a bibliographic citation.

In one embodiment, the citation module 114 includes a citation maintenance module 408. The citation maintenance module 408 can be configured to track each citation within a paper. For example, the citation maintenance module 408 can keep a log of each citation for each publication, the current location of the citation within the document (e.g., page number, line number, word number, character number, footnote number, endnote number, etc.), the date/time when the citation was inserted, and/or the number of times each citation has been cited in the publication. The citation maintenance module 408 can be configured to update a citation when bibliographic citation data associated with the cited publication is modified. This bibliographic citation data can be modified through the research management apparatus 104 or through the citation list module 404. In one embodiment, when bibliographic citation data for any publication in a publication library is modified, the bibliographic citation data may be flagged and a date and/or time associated with the flag. In this embodiment, the citation maintenance module 408 can identify each flag, and determine if bibliographic citation data has changed after the insertion or last update of a bibliographic citation in a paper. If it is detected that the bibliographic citation within a paper is outdated, the citation maintenance module 408 can update the bibliographic citation within the paper. In this way, the citation module 114 can automatically maintain the integrity of citations within a paper to ensure that the bibliographic citations within the paper include the same bibliographic data as stored in the publication library. Additionally, the citation maintenance module 410 can cooperate with the citation insertion module 406 to ensure that each bibliographic citation is properly formatted with the user's selected citation format. In one embodiment, the citation maintenance module 408 is further configured to update bibliography within the paper by working in connection with the bibliography module 410.

In one embodiment, the citation module 114 includes a bibliography module 410. The bibliography module 410 can be configured to automatically create a bibliography of references cited in a paper. With some citation formats, each bibliographic citation in a paper references an entry in a bibliography at the end of the paper. Accordingly, a bibliography module 410 can work in connection with the citation insertion module 406 and the citation maintenance module 408 to automatically populate a bibliography and maintain the integrity of the bibliography based on the current bibliographic data for each publication and the selected citation format. In an embodiment, the bibliography module 410 is configured to work in connection with the citation maintenance module 408 to automatically remove a bibliographic entry to a publication when all bibliographic citations to that publication are deleted from the paper. These abilities may assist to maintain the integrity of the bibliography while automatically populating the bibliography with entries based on the current citations within a paper.

In one embodiment, the citation module 114 includes a literature search module 412. The literature search module 412 can be configured to work with the access module 402 to search information on the research management apparatus 104 (via the literature search module 318) and return search results to the citation module 114.

In one embodiment, the citation module 114 includes a projects module 414. The projects module 414 is configured to work with the access module to access the project module 214 of the research management apparatus 104.

In one embodiment, the citation module 114 includes a groups module 416. The groups module 416 can be configured to work with access module 402 to access group information from the groups module 210 of the research management apparatus 104.

In one embodiment, the citation module 114 includes a synch module 418. The synch module 418 can be configured to synch modifications to data from the project module 414, the groups module 416, and/or the citation list module 404 with the modules of the research management apparatus 104. The synch module 418 can be configured to synch data as needed were on a periodic basis.

In an embodiment, the citation module 114 includes an image insertion module (not shown). The image insertion module is configured to access images within the user's publication library and/or image library and insert the images into the editable document. The images or a portion of the images can be displayed in the publication list or a separate image list on an image tab, menu, list, toolbar, or toolbox. When selected, a user can choose to insert a selected image into the editable document.

In an embodiment, the citation module 114 is configured to store and/or embed the publication list or a reference to the publication list in the electronic file of the editable document (e.g., the electronic data file of the editable document). Accordingly, if a user elects to share a copy of the document file with another person, the receiving person can also receive a copy of the publication list or receive a reference (e.g., such as an identifier, access code, pointer, etc.) that will allow the user to gain access to the publication list. This access can be beneficial to the other user when reviewing the document. By accessing the writing user's publication list a reviewing user is able to edit the non-editable text unit citations as necessary by making edits to the bibliographic citation data for publications in the publication list. For example, an electronic document file (e.g., such as a .doc or .docx file) can be modified to include information (e.g., in the form of white text) about the publication list used to add the inserted bibliographic citations into the document. Specifically, when a user uses a specific publication list when writing a document, that list and/or reference identifying information about that list can be stored/embedded with the document file by a list embed module 420. This can includes storing a number or other data in the data file of the document. In an embodiment, the research management apparatus 104 assigns each publication list an identification number or code. When the document containing the embedded or stored list information is opened, the access module 402 of the citation modules 114 can transmit the identification number or code to the research management apparatus 104 and download or otherwise receive the publication list associated with the transmitted number or code.

In some instance, the research management apparatus 104 can be configured to grant the user access to the publication list only if the user has permission to access the publication. This permission can be given for various reasons. For example, permission could be given only to registered users of the research management apparatus 104 and/or to members of the user's group identified by the author of the document, as previously described. In another embodiment, permission can be automatically granted to when a user shares the document with another user, such as via email, or other sharing tools. The receiving user gain automatic access or be required to enter an access code or the like.

In another embodiment, the list embed module 420 is configured to store or embed only a list containing publications cited in the document. Thus, if a publication in the drafting user's list was not cited in the citation, that publication will not be included in the stored or embedded list. In this embodiment, each publication in the user's publication list can be assigned an identification number or code and the list of identification numbers can be embedded or stored in the document. When accessed, the access module 402 of the citation module 114 can access each publication from the research management apparatus 104.

In an embodiment, the citation module 114 includes a list access module 422. The list access module can restrict access to the contents of the publication list saved or embedded within the document file to registered users of the research management apparatus 104. Accordingly, if an unregistered user attempts to access a document that includes bibliographic citations prepared by the citation module 114, the citation module may restrict the user's ability to either view, delete, add, and/or edit the bibliographic citations within the document. Further, the citation module may restrict the user's access to the publication list and/or information included in the publication list. In certain embodiments, the list access module 422 is configured to direct unregistered users to the research management apparatus 104 to register before gaining access to the publication list and/or ability to view, delete, add, or edit bibliographic citations with the document. Additionally, the access module may discriminate between registered users with a subscription and users without a subscription. Without a subscription, a user may only be able to review and/or edit basic information from the publication list, but may not be able to open full-text versions of the publication, view comments and social comments made on the publication, and/or access other features of the citation module 114 and research management apparatus 104.

Alternatively, the list access module 422 and/or other modules of the citation module 114 can be configured to convert the non-editable text bibliographic citations to editable text when the document is shared with another user or with an unregistered user or if the user does not have permission to access the publication list. If the unregistered user later registers and signs on, the citation module 114 can be configured to re-convert the bibliographic citations to non-editable text units.

Figure 5:
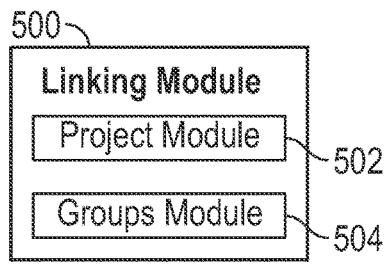
FIG. 5 is a schematic block diagram illustrating one embodiment of a publication citation module.

Reference will now be made to FIG. 5, which depicts an embodiment of a linking module 500. The linking module 500 can be substantially similar to the linking module 500 described above with regard to FIG. 1. Specifically, in some embodiments, the linking module 500 can be a plug-in or other suitable software component that provides additional, custom functionality to a spreadsheet application (not shown). In the depicted embodiment, the linking module 114 includes an access module 502, a projects module 512, a groups module 514, and a synch module 516. Each of these modules operate similar to like named module of the citation module 114 described with reference to FIG. 4 to provide similar functionality to the user of a spreadsheet processing application.

FIGS. 6 through 17 are screenshots depicting embodiments of web page 600 presented by the research management apparatus 104 and the literature review module 212. These screenshots have certain aspects in common, which may be referenced in the first figure in which they appear, but which may not be referenced in subsequent figures, to avoid repetition. These screenshots are intended as illustrative and not limiting. In other embodiments, a user interface of the literature review module 212 might present information in a different way.

Generally, the depicted web page 600 enables a user to select a publication from a list 620 of publications, review the publication in a display window 630, and make literature review actions (e.g., commenting, highlighting, adding a tag 640) and social literature review actions to the publication. In certain embodiments, the web page 600 can be configured to permit a group of users to access the publications within a publication library, or publications within a list 620. Moreover, the webpage 600 can be configured to permit members of a group to add social comments, social highlighting, and/or other social literature review actions to publications shared by the group. Embodiments of specific features of the website 600 will be described in more detail below.

In the depicted embodiment, the web page 600 includes a control bar in the upper portion of the web page 600. The tabs presented on the control bar can be configured to function as links that activate various modules of the research management apparatus 104. For example, the workgroups tab 604 can be a link to a web page presented by the groups module 210. The initiatives tab 606 can be a link to a web page presented by the project module 214. The literature review tab 608 can be a link to a web page presented by the literature review module 212. The lit search tab 610 can be a link to a web page presented by the search module 202. The reports tab 612 can be a link to a web page presented by the report module 216. The name 602 of the web application ("GoKnowledge") on the left side can be a link to a web page, such as a home page, presented by the research management apparatus 104 or a module thereof The search box 614 can be a link to a webpage presented by the research management apparatus 104 for conducting searches of the entire website, including each of the tabs thereof. The name of the user 616 ("John Romney") and/or the gear thereby can be a link to a user account provided by the user module 208 and can indicate the user name of the user who has logged into the research management apparatus 104. When no user is logged in, this area can include a "login" button through which a user can log in to his/her user account.

Figure 6:
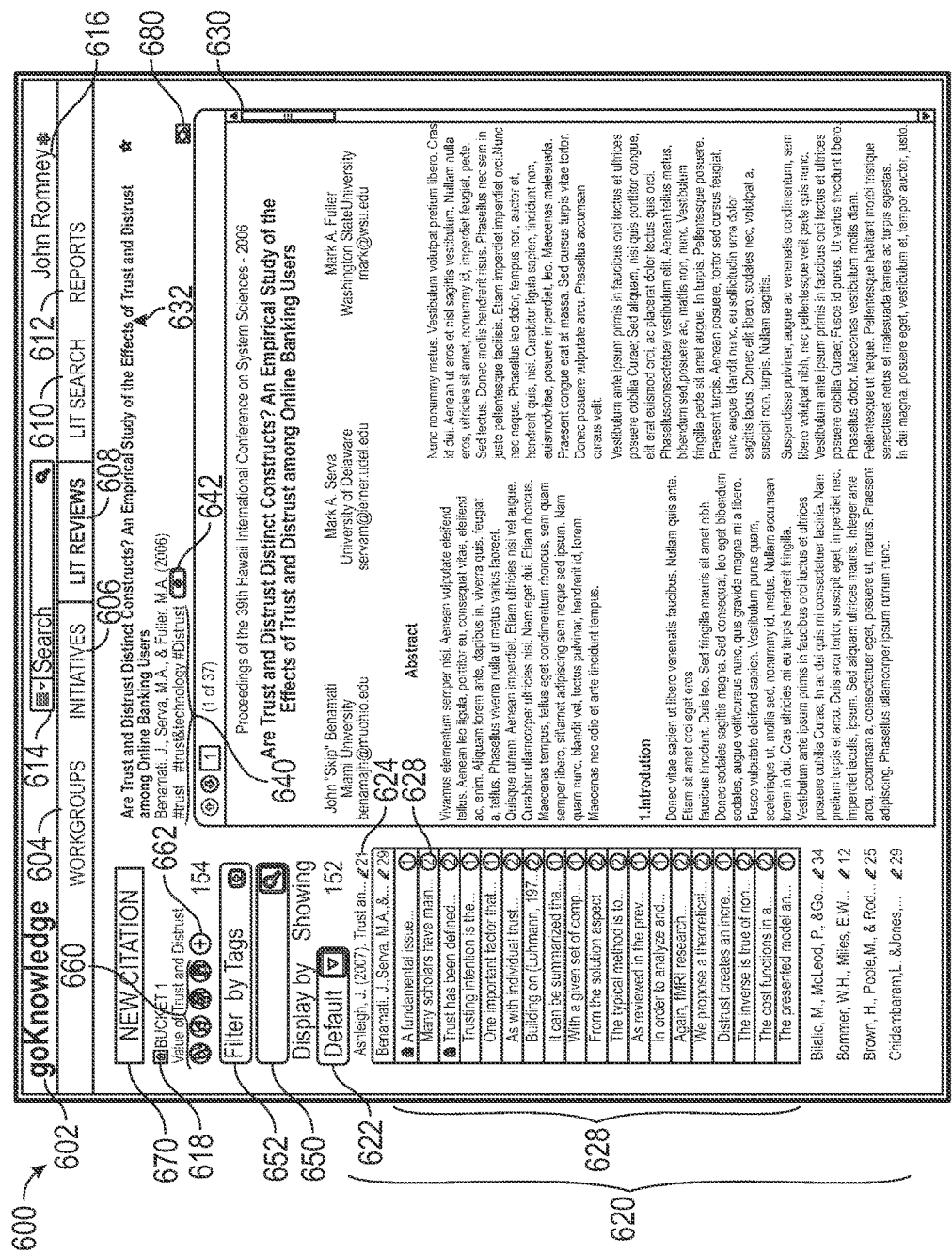
FIG. 6 is a screenshots illustrating an embodiment of a website presented by the publication preparation apparatus.
Figure 7:
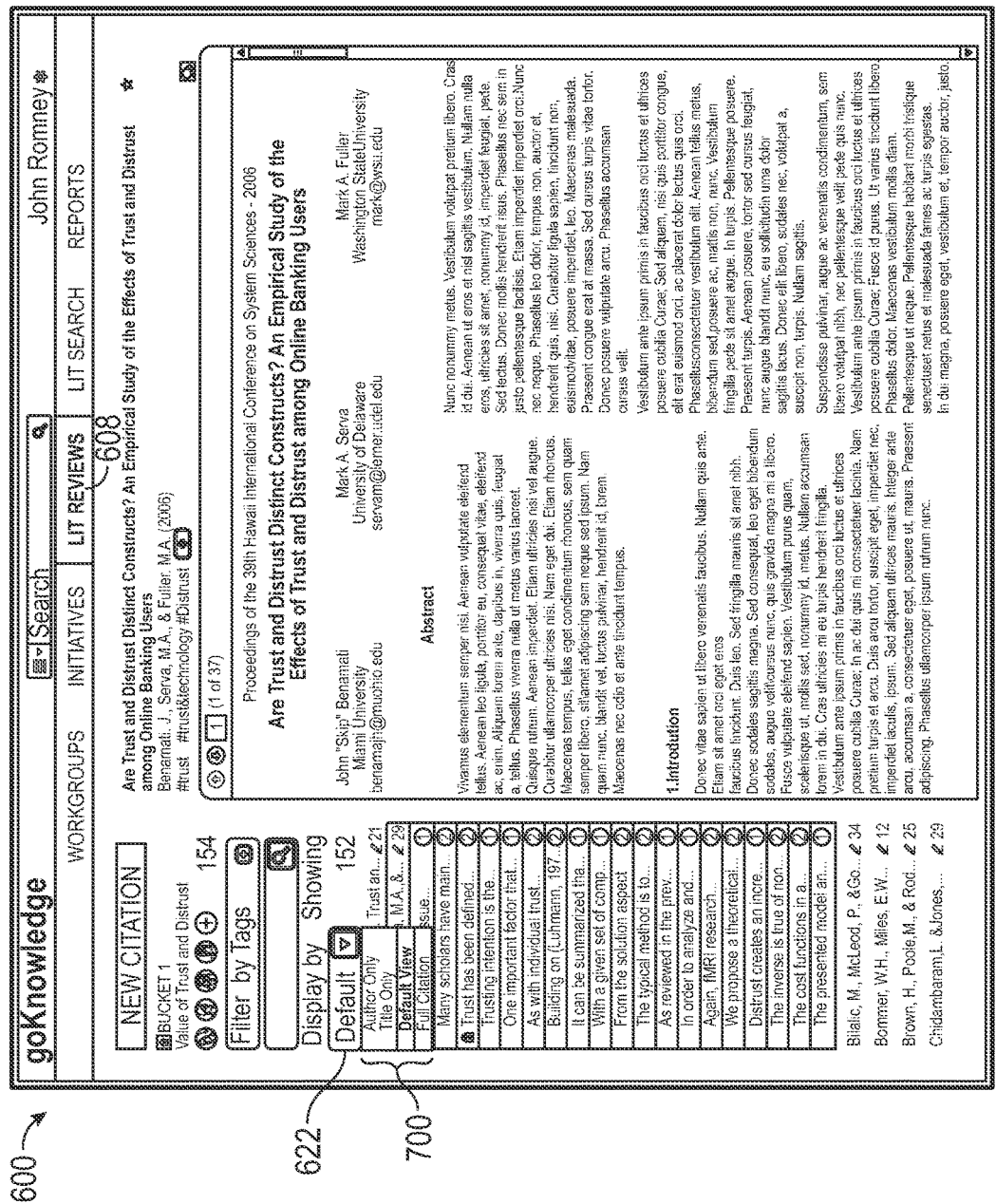
FIG. 7 is a screenshot illustrating another embodiment of a website presented by the publication preparation apparatus.

In the depicted embodiment of FIG. 6, the lit review tab 608 of the web page 600 is shown. The features of the lit review tab 608 can be presented by the literature review module 212. The webpage 600 generally displays information and user tools for adding and removing publications from a list or library, performing literature review actions, social literature review actions, and searching of publications within a publication list and/or library. The webpage 600 can include a list 620 of publications presented at least in part by the list module 302. As shown, in an embodiment, the list 620 of publications displays citation information for each publication. For example, the first publication is displayed using an abbreviated form of the publications citation ("Ashleigh, J. (2007). Trust an . . . "). As shown in FIGS. 6 and 7, the format of the list 620 of the publications can be changed by selecting a display option 700 from a menu 622, such as the depicted drop-down menu. As shown in FIG. 7, other types of lists displays can include author only, title only, default view, full citation, or other suitable list formats. In one embodiment, each user may have more than one list of publications. A user may store lists in a bucket or folder, which may be represented by an icon 618, button, or menu. When selected, this icon 618 or other representation allows a user to access to select one or more publication lists from his/her publication library. Several such levels of categorization may be provided by the website and the research management apparatus 104 to facilitate organization of each user's publications, publication libraries, and publication lists.

Figure 8:
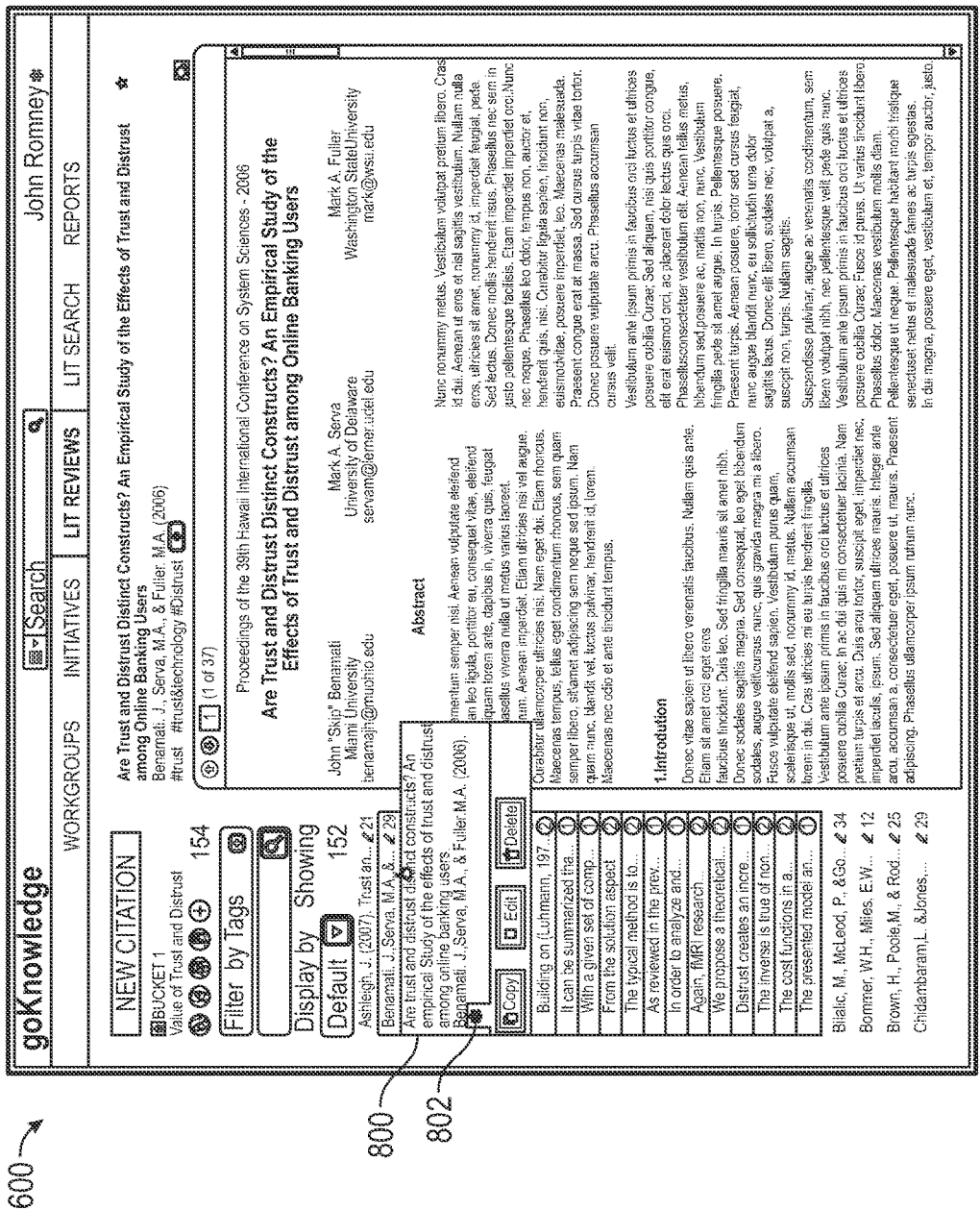
FIG. 8 is a screenshot illustrating another embodiment of a website presented by the publication preparation apparatus.
Figure 9:
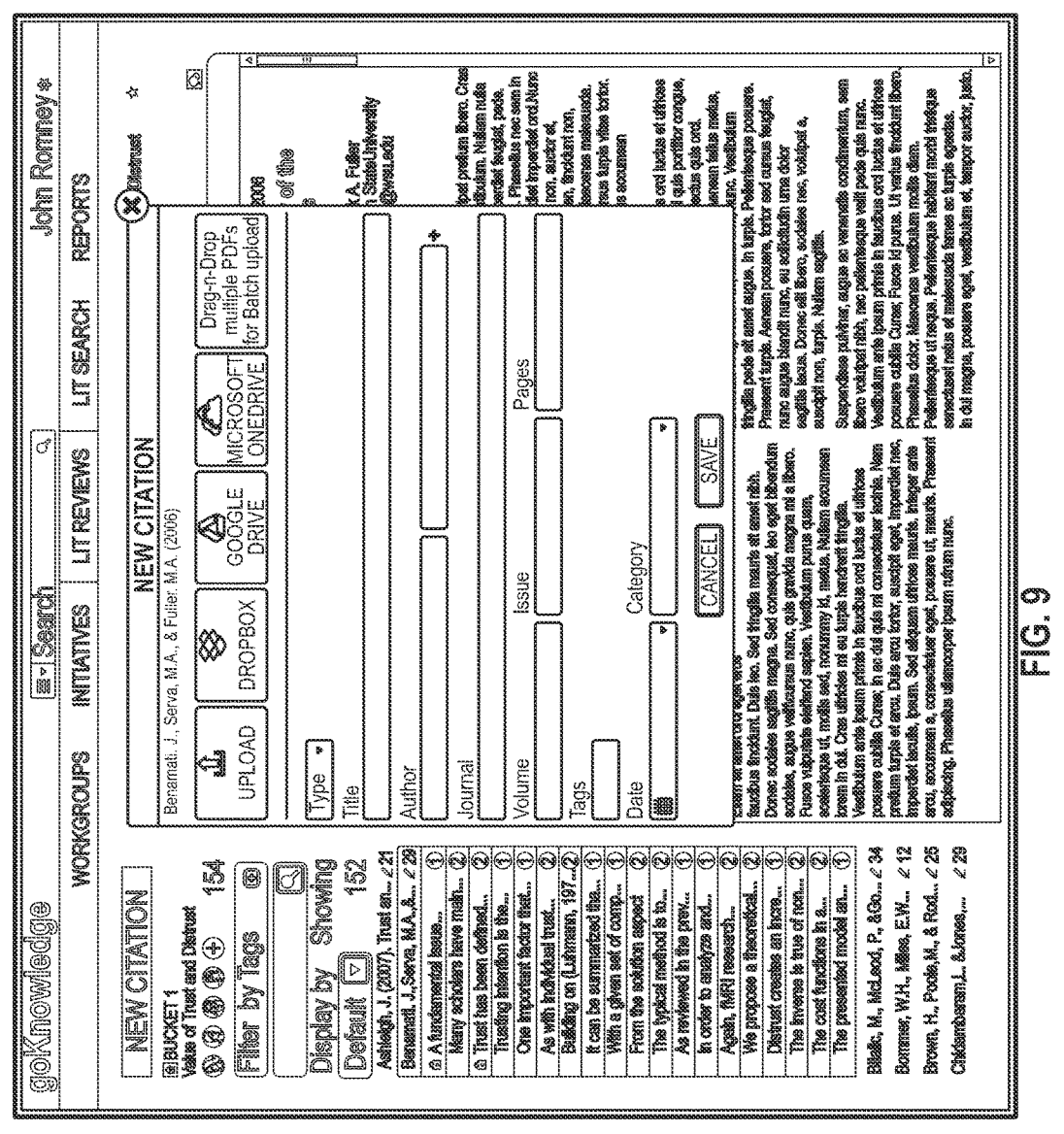
Figure 10:
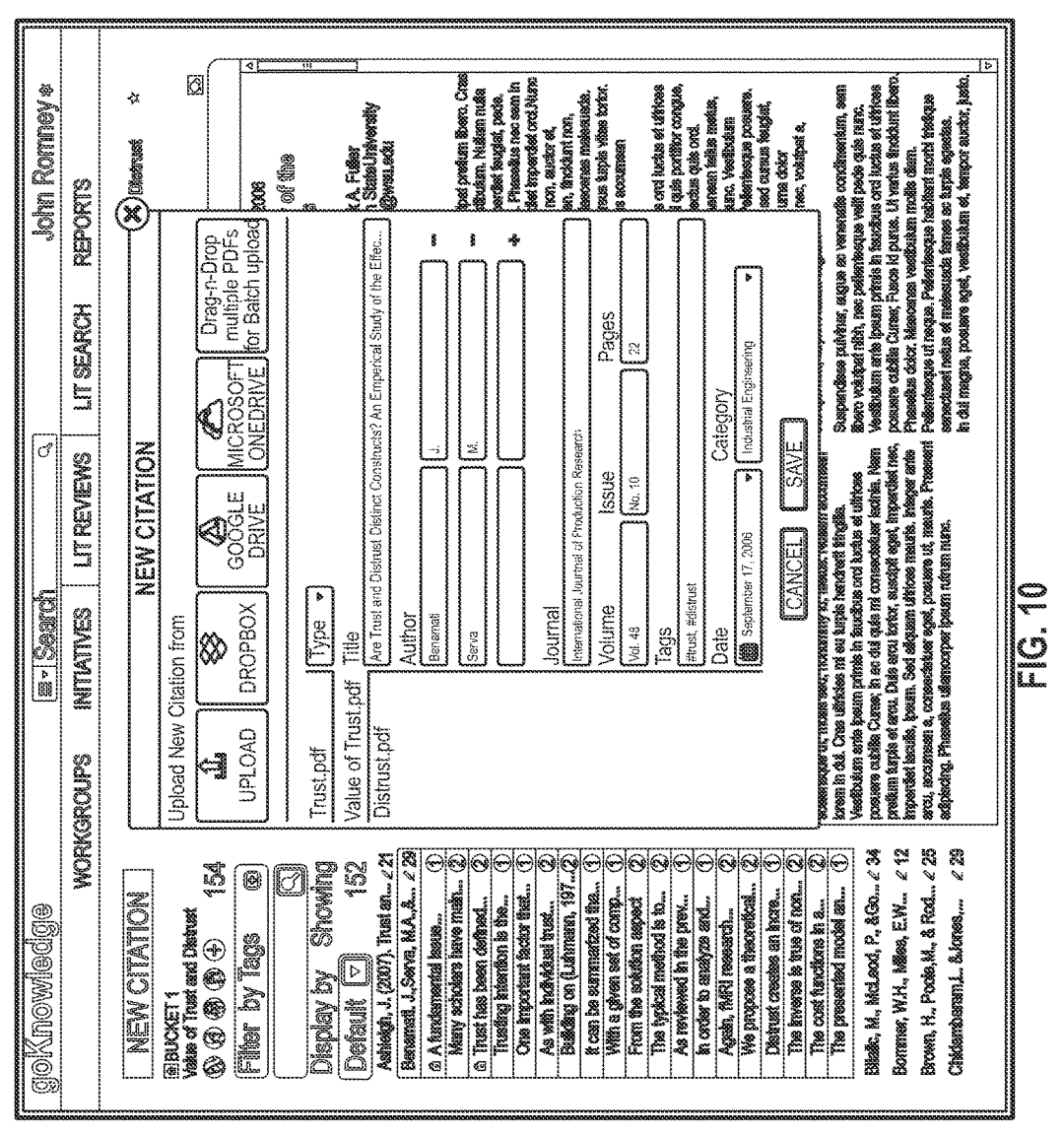
Figure 11:
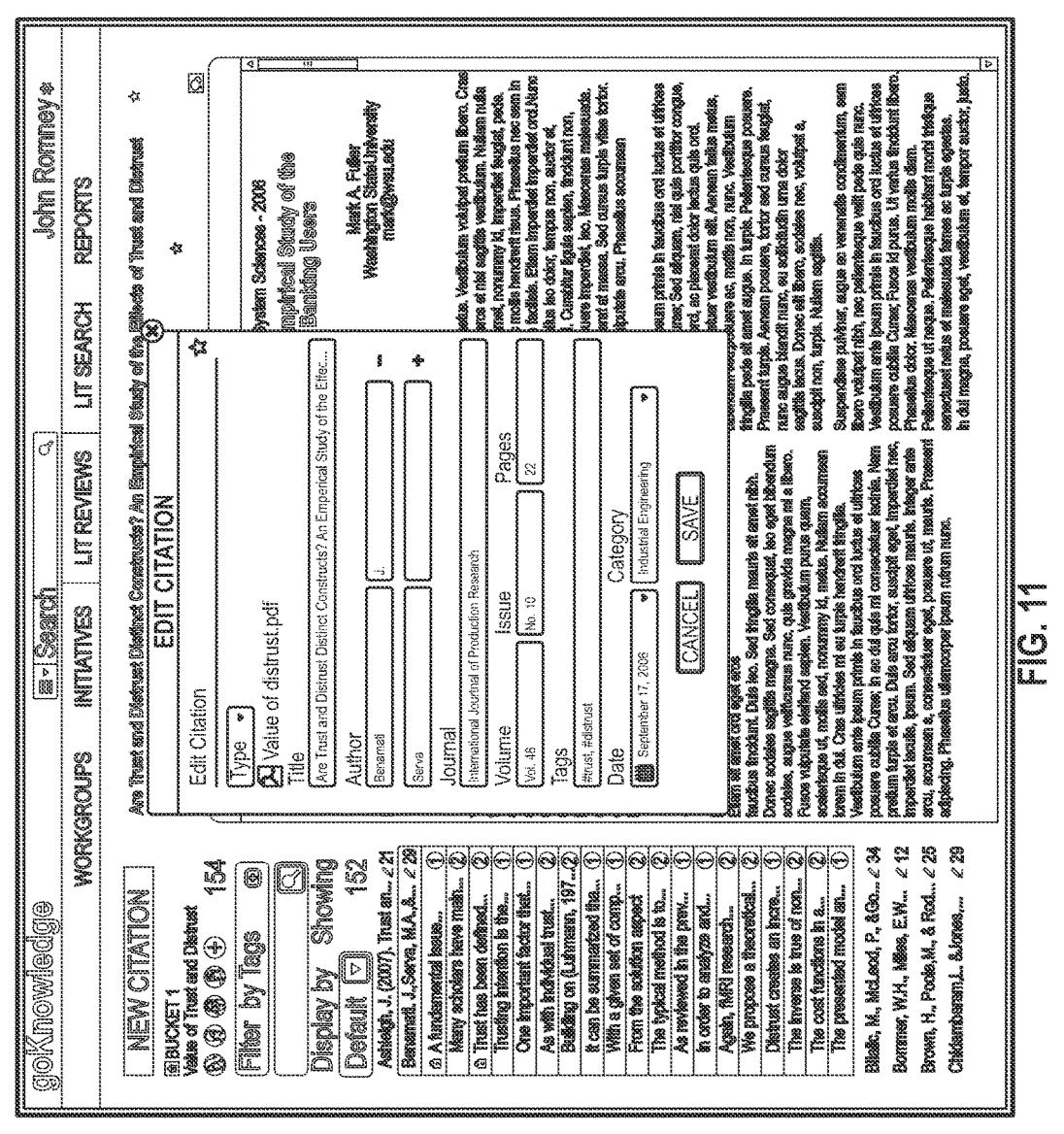
Figure 12:
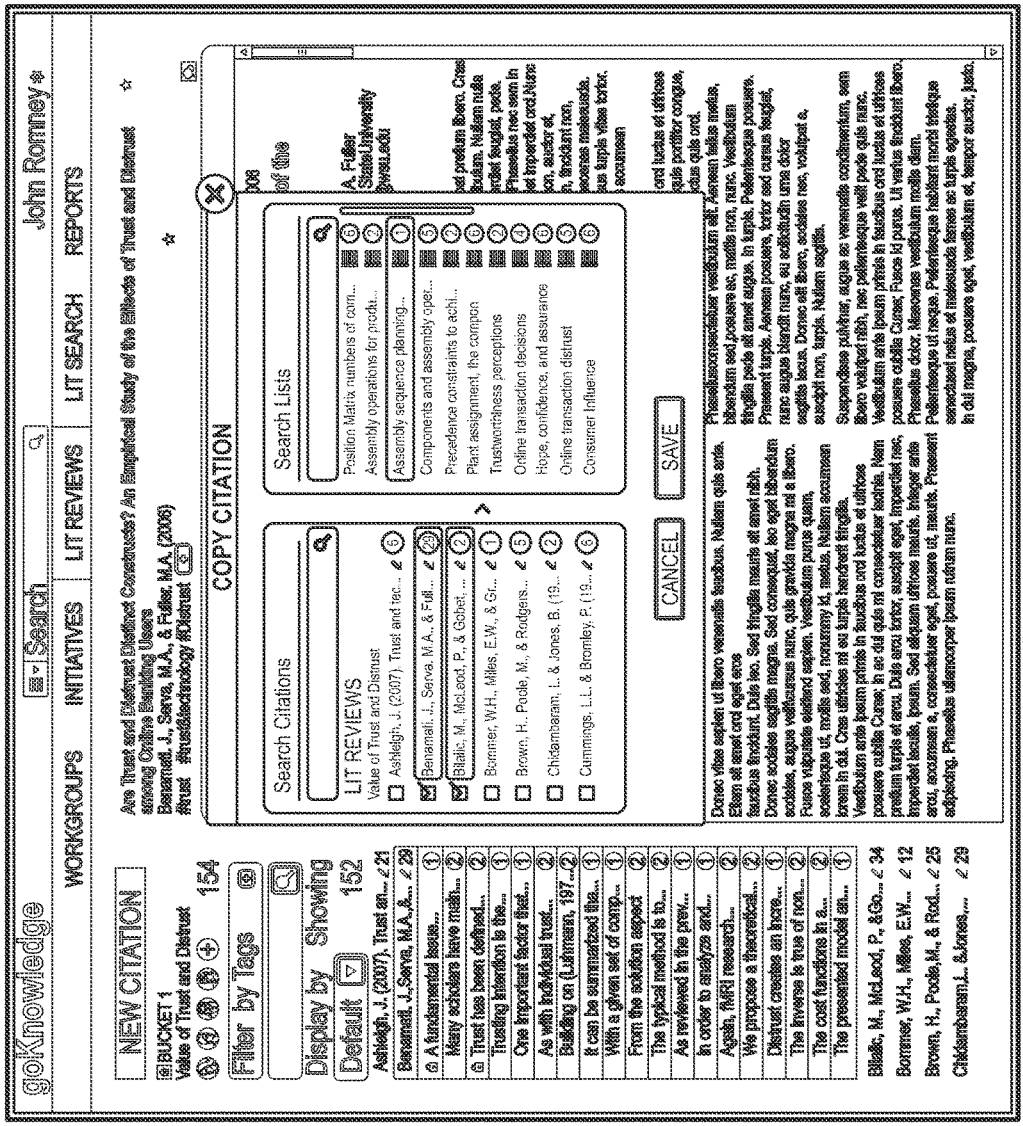
FIG. 12 is a screenshot illustrating another embodiment of a website presented by the publication preparation apparatus.
Figure 13:
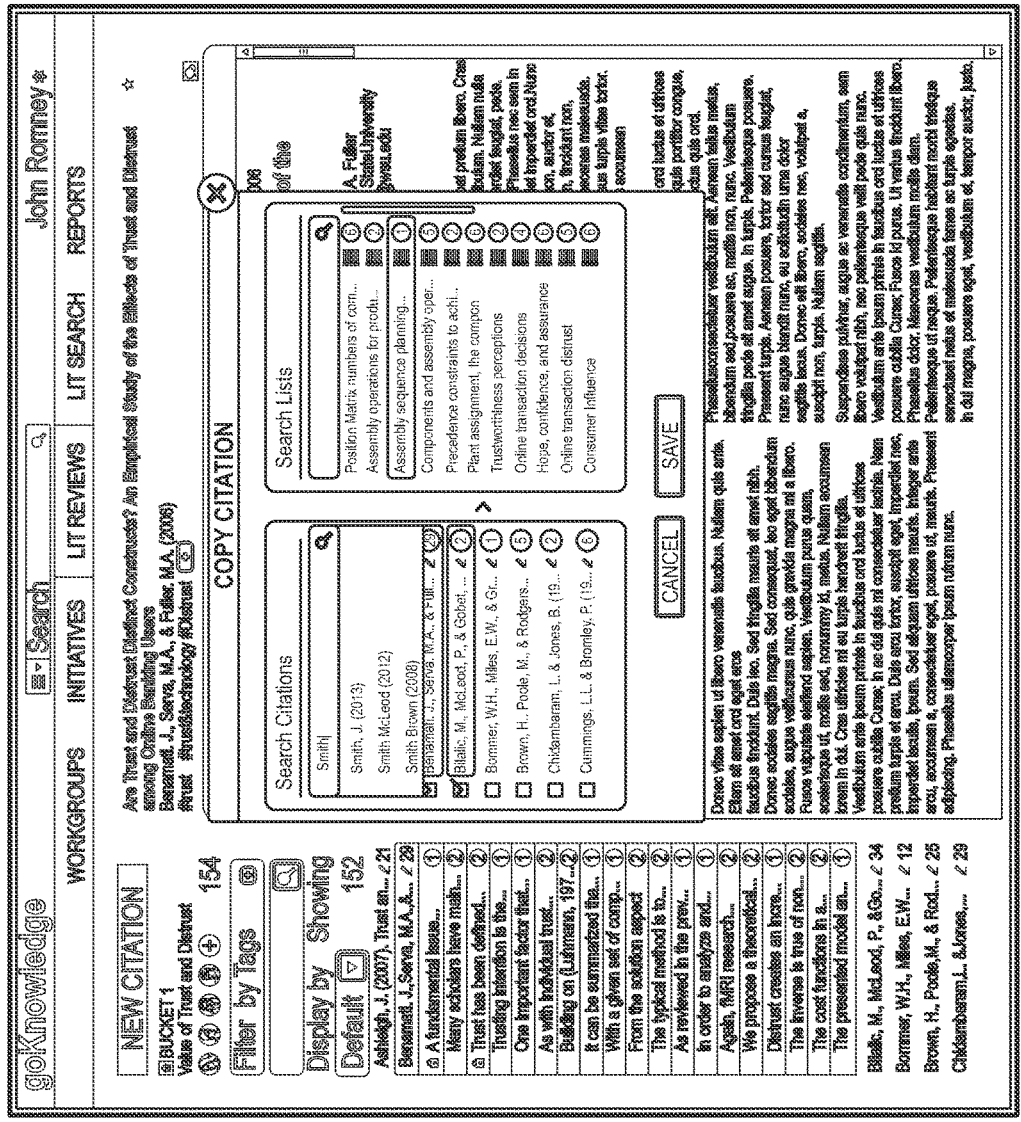
FIG. 13 is a screenshot illustrating another embodiment of a website presented by the publication preparation apparatus.
Figure 14:
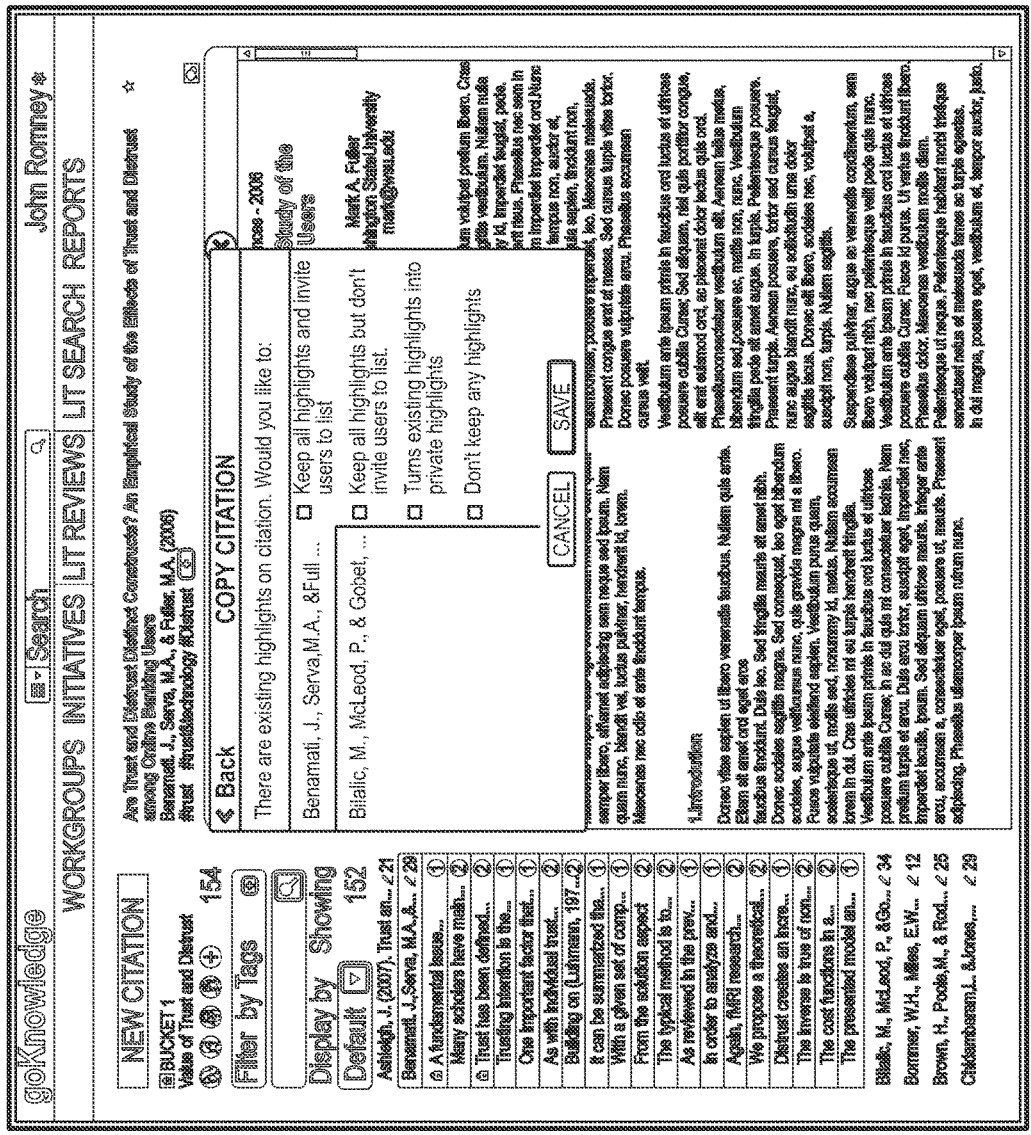
FIG. 14 is a screenshot illustrating another embodiment of a website presented by the publication preparation apparatus.

The list 620 of publications includes a counter 624 next to each publication. The counter 624 can identify the number of literature review actions performed on each publication or simply the number of highlights and/or comments on each publication. For example, the second publication (called "Benamati, J., Serva, M. A., & . . . ") has a counter of "29" displayed next to it. This counter represents that twenty nine literature review actions or highlighting and/or comments have been made to this publication. When a publication from the publication list is selected, the full text of the publication can be shown in a display window 630. For example, the Benamati publication is selected in the depicted embodiment and a full-text version of the Benamati publication is shown in the display window 630. Moreover, as shown in FIG. 8, when a user toggles a pointer over the name of a publication or selects the publication, a text box 800 may appear that displays a description of the publication or a bibliographic citation for the publication. By selecting the depicted gear icon 802, a user may be presented with options of copying, editing, or deleting the publication or bibliographic citation information for the publication. Examples of user interfaces presenting these functions to the user are shown in FIGS. 9 through 14. Specifically, FIGS. 9 through 10 illustrate a user interfaces facilitating the addition of a new publication to the user's publication library. FIG. 11 illustrates a user interfaces facilitating the editing of a publication within the user's publication library or the bibliographic citation information associates with that publication. FIGS. 12 through 14 illustrate the copying of a publication from a first publication list to another publication list or from the user's publication library to a publication list within the user's publication library.

Referring back to FIG. 6, in one embodiment, each publication in the list 620 of publications can be expanded. For example, when selected, a publication can expand to show a list 626 of highlighting and/or comments made to the selected publication. This list 626 can only highlighting, only commenting, only comments and highlighting, comments and highlighting and publication adding/linking, or other combinations of literature review actions added to the publication. When a user selects the literature review action from this list 626, such as the first listed action, "A fundamental issue . . . " the display window 630 can be configured to scroll to the portion of the publication that includes that literature review action along with the portion of the document that that action is attached to. Additionally, each literature review action in the list 626 of literature review actions can also include a counter 628. The counter can be set to one if no social literature review actions were performed on the literature review action. The counter can increase for each social literature review action performed on the literature review action. Thus, a comment that been socially commented on twice can include a counter of three.

As further depicted in FIG. 6, the lit reviews tab 608 can display a title and/or bibliographic citation data 632 for the publication that is displayed in the display window 630. In one embodiment, the title, bibliographic citation data 632 and/or the display window can be presented by the display module 302.

In one embodiment, the lit review tab 608 and the literature review module 212 can be configured to enable a user to add one or more tags 640 to a publication. As previously mentioned, the tag 640 can represent a categorization or other such label that is applied to the publication. In one embodiment, a user can select an icon, such as the "+" icon 642 to add a tag 640 to a selected publication. Tagging publications can help user and their fellow group members to easily categorize or label publications. As shown, in some instances, tags 640 may be designated with a hashtag (#) symbol.

In the depicted embodiment, the website 600 includes a search feature 650 configured to search within the publications in the list 620 of publications. The website 600 can also include a search filter 652 that allows a user to filter or narrow a search by tags 640 on each publications. In one embodiment, the search feature 650 can be presented and supported by the literature search module 318.

In one embodiment, the web page 600 is configured to display the group 660 of users who have access to the selected publication, list 626 of publications, and/or publication library. In the depicted embodiment, the group of users is shown as icons or photographs of the users. Additional users can be add using the "+" icon 662. Prospective users may be invited by providing their email address(es) by selecting them from a system database. The system database may record all users associated with the system 100, such as users who have paid a subscription to use the system 100. Additionally or alternatively, members of a group may be added or removed using the workgroup tab 604. In one embodiment, these features are presented at least in part by the groups module 210.

As further depicted in FIG. 6, the website 600 can include a button 670 or other feature that can be selected by a user to add a publication (referred to in the Figures as a citation) to the list of publications and/or to the user's publication library. FIGS. 9 through 14 depict pop-up windows for adding a new publication to the publication library, editing a publication within the publication library, and copying the publication. These windows can appear when a user selects the button 670 for adding a new or editing publication. Each of these windows may be presented by the load module 204. As shown in FIG. 9, a publication may be uploaded from a local library or drive or uploaded from Dropbox™, Google Drive™, or Microsoft OneDrive™. In other embodiments, publications may be uploaded from other online or local data stores or libraries. As further shown, bibliographic citation information, category information, tags, and other such information may be manually or automatically added to or edited within a publication profile. Copying a publication can include adding the publication from a publication library to a list. For example, an individual user may have his/her own publication library that includes each of the publications he/she has found through the system 100. The user may add a publication from that library into multiple lists, with each list representing a separate publication that the user is working on. As depicted in FIG. 14, a publication may be copied to a list while retaining or deleting all prior highlights out and/or comments previously made on the publication.

The website 600 can include a comment icon 680 that allows a user to view all comments made to that publication. An example of this is shown in FIG. 16, as described below.

Figure 15:
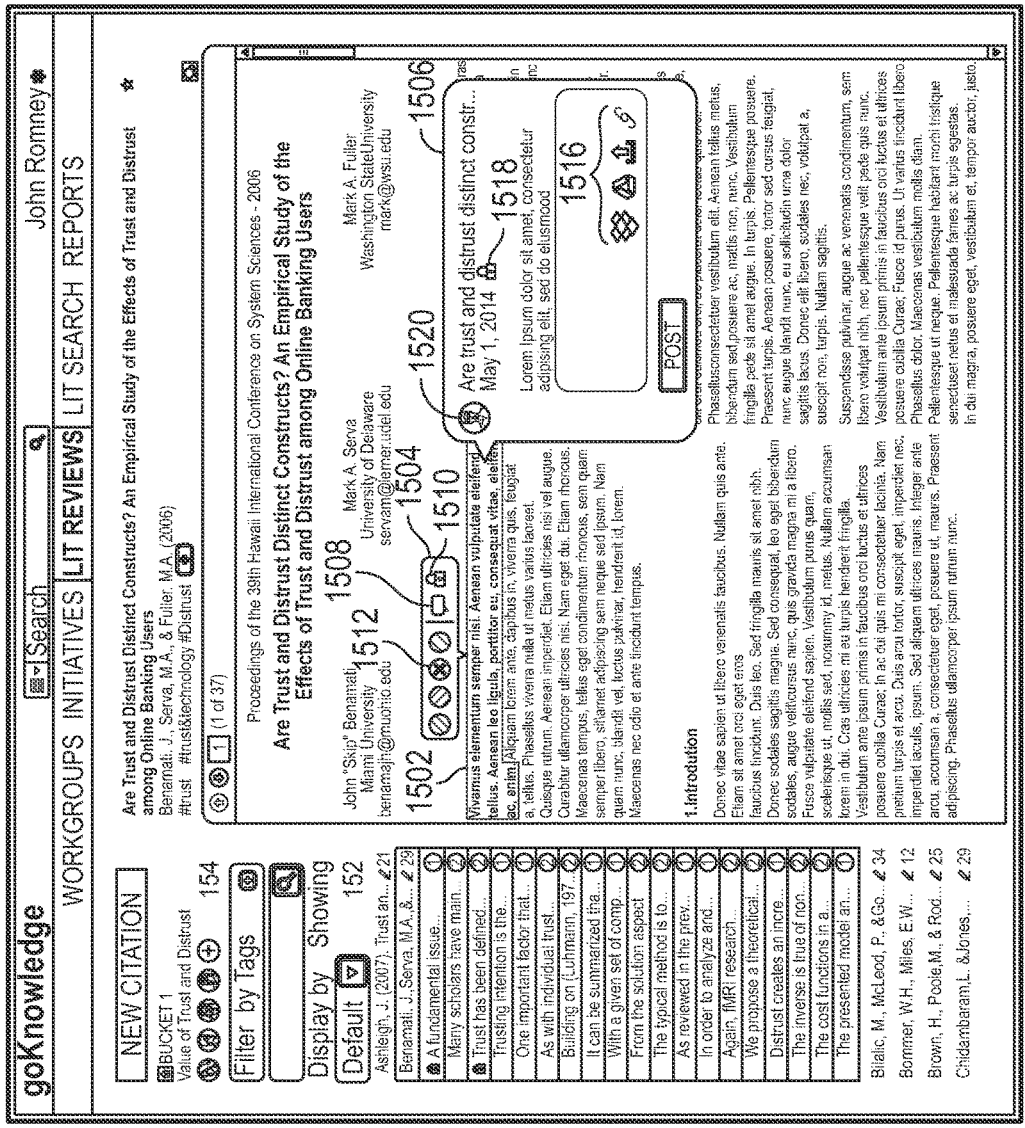
FIG. 15 is a screenshot illustrating another embodiment of a website presented by the publication preparation apparatus.
Figure 16:
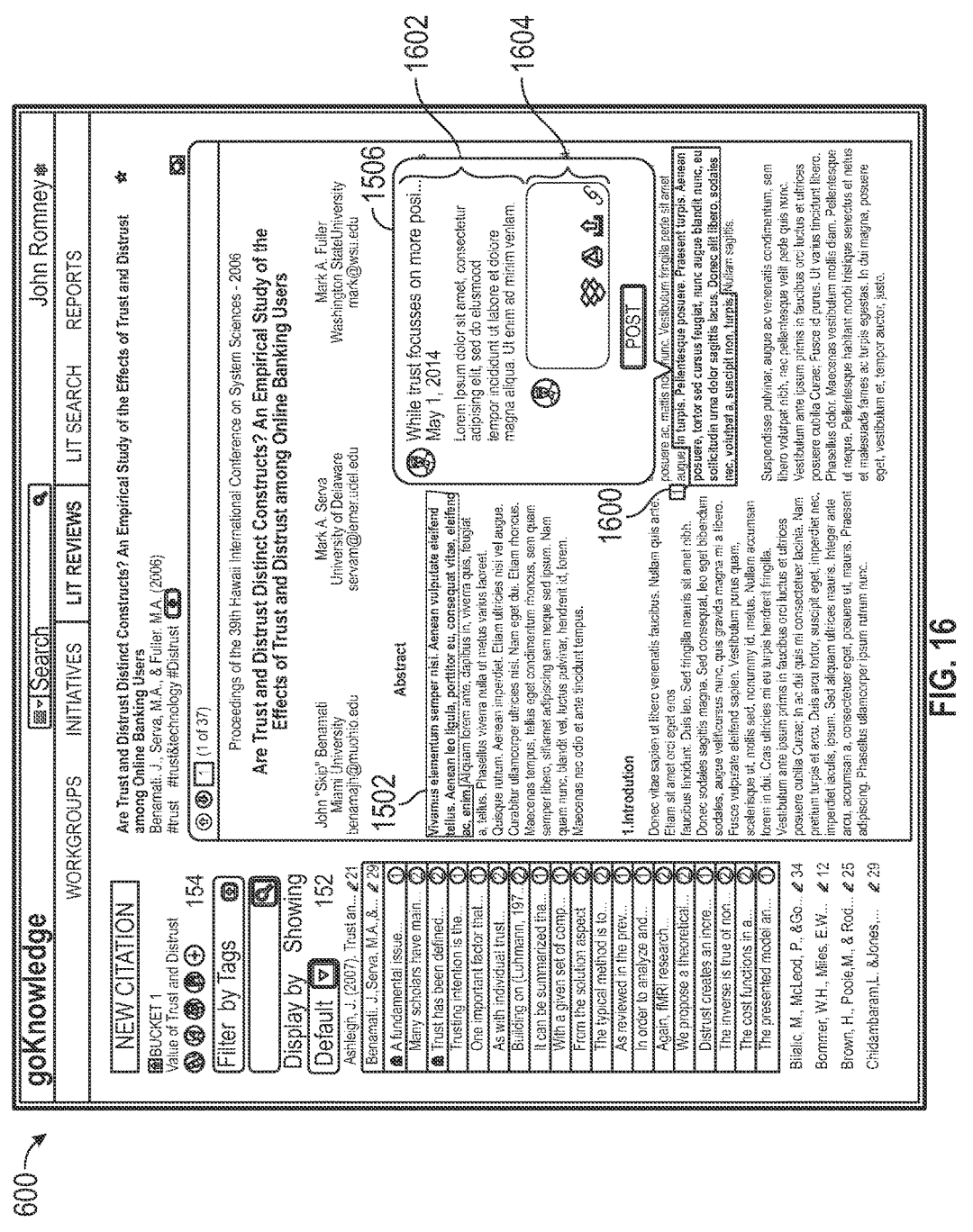
Figure 17:
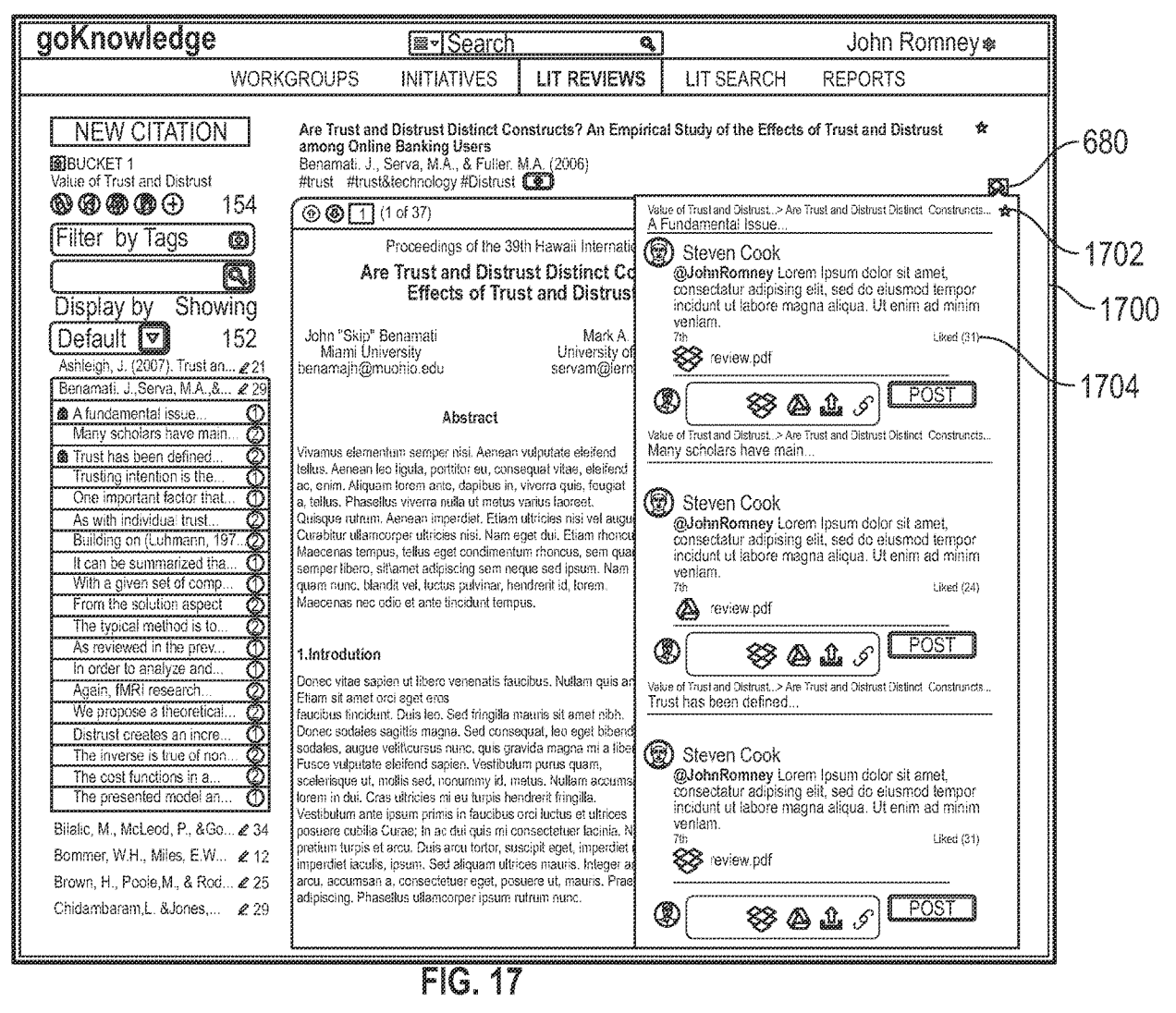
Figure 18:
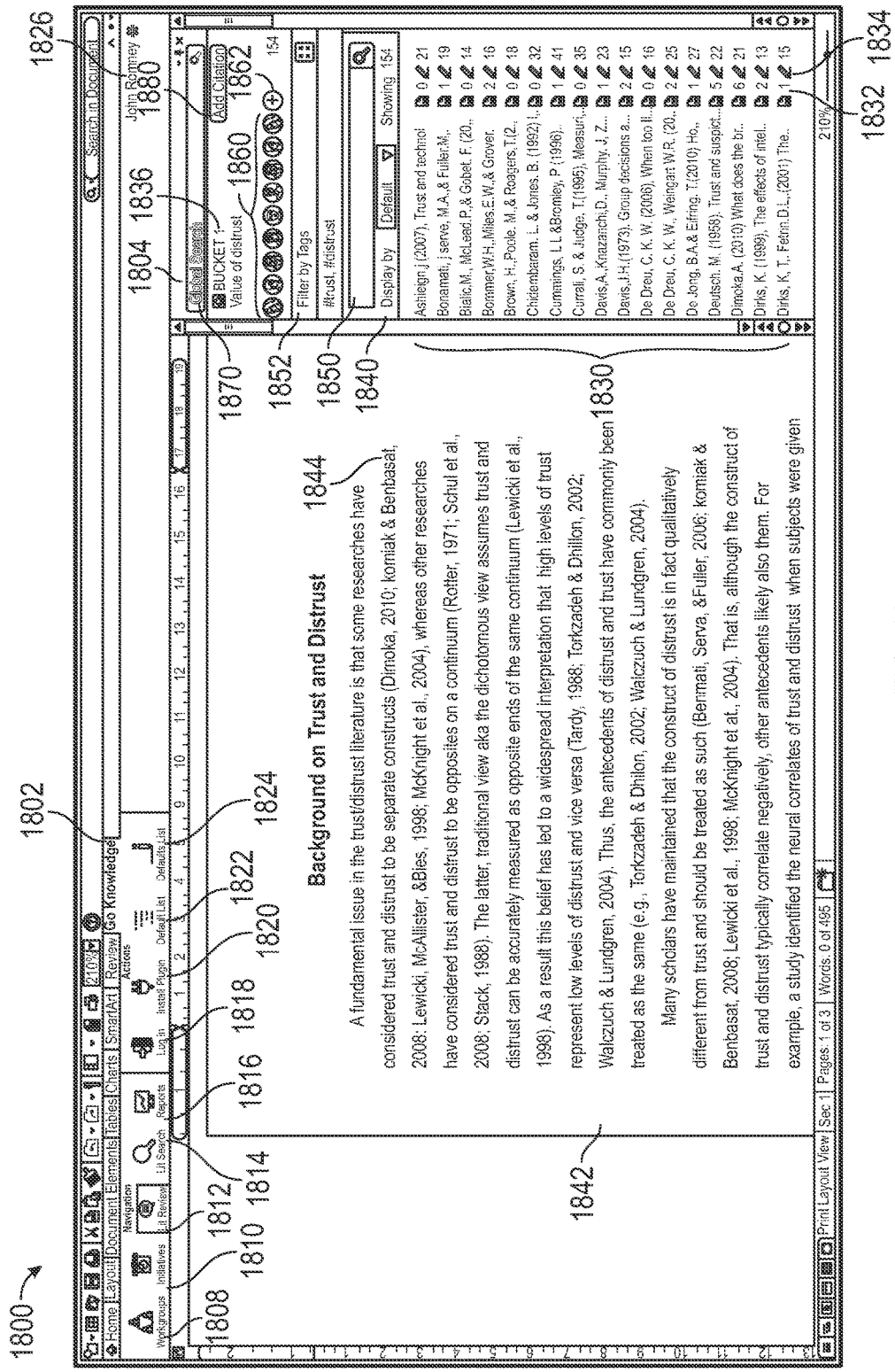
FIG. 18 is a screenshots illustrating an embodiment of a word processing application and plug-in presented by a word processing apparatus and a publication citation module, respectively.

Reference will now be made to FIGS. 15 through 17, which depict the addition of literature review actions to a publication. FIG. 15 depict the act of highlighting text within a publication and/or adding a comment to selected text. These features may be presented by the comment module 306 and the highlight module 308. During the process of literature review, the reviewer/user may choose to highlight selected portions of a publication and add comments to portions of the text. In one embodiment, the user may select a portion of text to highlight and/or link to a comment. In one embodiment, when the user selects text, a toolbar 1504 can be presented to the user. The toolbar 1504 provides the user with the option of adding highlighting 1502 the selected text and/or adding a comment to the selected text. As shown, the toolbar 1504 can include a color palette that provides the user with multiple colors of highlighting. In an embodiment, the toolbar 1504 may also include the option to lock or make private the highlighting. For example, the toolbar 1504 may include a lock icon 1510 that initiates one or both of these functions. Additionally, the toolbar 1504 can include a comment icon, which when selected opens a comment window 1506 through which the user may add a comment that is associated with the highlighted text. The illustrated toolbar 1504 also includes a delete icon 1512 that allows the user to delete existing highlighting or comment. In other embodiments, the toolbar 1504 can be replaced with alternative options for inserting highlighting and comments.

As shown, when a user indicates an intention to add a comment to selected text, a comment window 1506 may be presented. The comment window generally provides the user with the ability to type a comment that is associated with the selected text. Additionally, in an embodiment, the user may also be provided with the option of uploading or linking a document to that comment. These features may be presented by the link module 310 and the upload module 312. Uploading may be initiated through one or more upload icons 1516, as shown. Additionally, a user can designate the comment as private or locked, such as by selecting the lock icon 1518. When the comment is finalized, the user may select the post icon. In an embodiment, the comment can automatically include the commenting user's name, a picture of the user 1520, or another suitable identifier.

As mentioned, the publication may have a non-editable format, such as a PDF format. Accordingly, the literature review module 212 can be configured to save all highlights and comments in a separate storage location. For example, the data identifying highlighting and comments within a publication may be stored separately from the publication and loaded into the literature review module 212 when the publication is opened in the display window 630. This feature can enable a user to upload a higher quality version of the publication and transfer the highlights and comments from one version of the publication to another. Alternatively, the literature review module 212 can be configured to edit the publication file and save the edits made within the publication. For example, the literature review module 212 can be configured to add highlighting and comments directly within the PDF file.

FIG. 16 depicts an example of social commenting. As shown, the publication includes selected text that includes a comment. The comment is identified by a comment icon 1600. When the comment icon 1600 is selected or the comment is otherwise opened, the comment window appears and displays the initial comment 1602. If the comment was made by the user, the user may add an additional comment or edit the comment. If the comment was made by another user, that other user may add a social comment (i.e., a comment on the initial users comment or on the selected text). The social comment may be added in the same way the comment was added. Additionally or alternatively, a user may upload or link a document to that comment through one or more upload icons 1516.

As depicted in FIGS. 6 and 17 and as previously mentioned, the website 600 can provide a comment icon 680 which when selected opens a comment window 1700 that displays all comments and social comments made by a user or group member on the selected publication. As further depicted, each comment can be rated or "liked" by other members of a group. For example, the comment window 600 or 1700 can include a rating feature, such as a star icon 1700, "like" button, a rating scroll bar, a selectable number stars that designate a ranking, or another suitable feature. The comment window can depict these ratings in various ways, such as the illustrated "liked" counter 1700. The rating of comments can be useful to identify which comments are most valuable, contested, and/or discussed in a publication. These features may be presented by the like module 320 and the rating module 322.

Reference will now be made to FIGS. 18 through 23, which depict screenshots of an embodiment of a word processing application 1800 presented by the word processing module 112 and a plug-in 1802 presented by the citation module 114. This group of screenshots have certain aspects in common, which may be referenced in the first figure in which they appear, but which may not be referenced in subsequent figures, to avoid repetition. These screenshots are intended as illustrative and not limiting. In other embodiments, a user interface of the word processing application 1800 and a plug-in 1802 might present information in a different way.

In the depicted embodiment the word processing application 1800 is a Microsoft Word™ word processing application that presents an editable document 1842 to the user for creation and/or editing. The word processing application 1800 includes a plug-in 1802 (called "GoKnowledge"). The plug-in 1802 is represented as a tab in an upper portion of the word processing application 1800. When selected, the plug-in 1802 opens a menu, which is shown in the upper portion of the word processing application window. The menu can include various navigation tools, such as a workgroups tool 1808, and initiatives tool 1810, a lit review tool 1812, a lit search tool 1814, and/or a reports tool 1816. The workgroups tool 1808 can open a window or toolbar that accesses information from the groups module 210. The initiatives tool 1810 can open a window or toolbar that accesses information from the project module 214. The lit review tool 1812 can open a window or toolbar that accesses information from the literature review module 212. The lit search tool 1814 can open a window or toolbar that accesses information from the search module 202. The reports tool 1816 can open a window or toolbar that accesses information from the report module 216. Each of these tools can access information from these modules using, at least in part, the access module 402.

The menu from the plug-in 1802 can also include various action tools, such as a login tool 1818, and install plug-in tool 1820, list tool 1822, and/or a style tool 1824. The login tool 1818 can be configured to open a window or browser 110 to enable the user to log on to the research management apparatus 104 through a computer network 106. The login tool 1818 can work in connection with the access module 402 to access information from the research management apparatus 104. When logged in, the user's account may be accessed, including publications from the user's publication library and publication lists, which can include bibliographic citation information for each publication and literature review actions made on each publication. In one embodiment, the user's name 1826 can be shown in the menu when the user is logged in. The install plug-in tool 1820 can enable a user to install the plug-in or additional features of the plug-in. The list tool 1822 can enable a user to customize the format of the list of publications presented through the plug-in 1802 or select the list to be presented through the plug-in from the user's publication library. The style tool 1824 can allow a user to change the style or default style of the plug-in, the citation format, and/or other features of the plug-in.

In the depicted embodiment, the lit review tool 1812 is selected, which opens a literature review sidebar 1804. Alternatively, when the literature review tool 1812 is selected, a literature review window (not shown) or menu (not shown) is opened. The literature review sidebar 1804 can include many similar features and tools available through the website 600, as described with reference to FIG. 6. For example, the literature review sidebar 1804 can display icons or images of members of the users group 1860 as well as providing an icon 1862 for adding members to the group. These numbers may be granted access to the document 1842. Similarly, the literature review sidebar 1804 can enable a user to search through the publication in the publication list 1830 using a search feature 1850 and search filter 1852, which can be similar or identical to the search feature 650 and search filter 652 shown and described with reference to FIG. 6. An example of these search functions is shown and described with reference to FIGS. 22 through 23.

This literature review sidebar 1804 can present easily accessible information about a user's research to a user who is in the process of creating a new document 1842. This accessibility can allow a user to easily search through and access the publications identified in his/her research, review the highlighting and comments and social comments made in these publications, and easily insert a citation to the publication into the user's paper. Moreover, in certain embodiments, the literature review sidebar 1804 can allow the user to easily communicate and share the paper and/or portions of the paper with members of the user's group.

As shown, the literature review sidebar 1804 can allow the user to select a publication list from a bucket 1836 or folder in the user's publication library. Once selected, the list 1830 of publications is displayed in the literature review sidebar 1804. As with the list 620 of publications described in FIG. 6, the display format can be changed using a display format drop-down menu 1840. Additionally, each listing can include a counter 1834 which indicates the number of comments, highlights, and/or other literature review actions are made to the publications. Each listing can additionally or alternatively include a citation counter 1832 that counts the number of times each publication has been cited in the document 1842.

Figure 19:
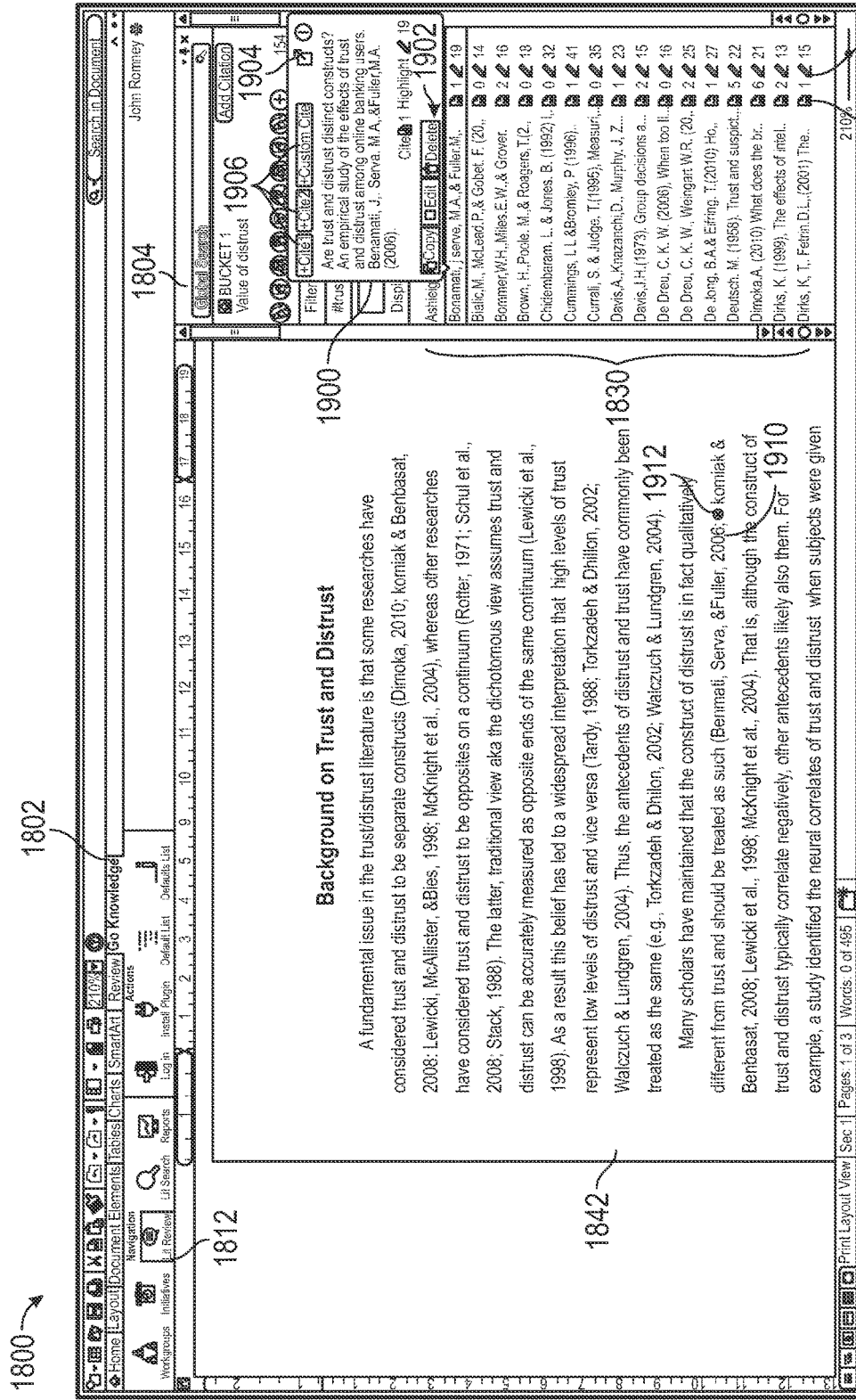
FIG. 19 is a screenshots illustrating another embodiment of a word processing application and plug-in presented by a word processing apparatus and a publication citation module, respectively.

As depicted in FIGS. 19, in one embodiment, the individual publication listings in the literature review sidebar 1804 can be selected to open a window 1900 that present details about the selected publication and tools for managing this publication. These details can include a full citation for the publication. In a certain embodiment, the window 1900 can include tools for editing this information or deleting the publication. For example, in the depicted embodiment a gear icon may be selected to reveal tools 1902 for copying the publication, editing the bibliographic citation information of the publication, or deleting the publication from the list 1830 and/or from the user's publication library. By selecting one of these tools 1902 a window may be presented to the user similar or identical to the windows presented in FIGS. 9 through 14 through which the user can copy, edit, or delete publications within the user's publication library. In one embodiment, an open icon 1904 can be included in the publication detail window 1900 through which the user can open and access the publication the research management apparatus 104 through a browser 110 that accesses the research management apparatus 104. Through the publication detail window 1900, the user can opt to insert a citation 1910 to the selected publication into the document 1842. This may be done by clicking an insert citation button 1906. In the depicted embodiment, multiple insert citation buttons 1906 are presented for inserting various forms of the citation. In other embodiments, the user may insert a citation to a publication in the listing 1830 merely by selecting the listing or through another suitable process.

When a user inserts a bibliographic citation to a publication from the list 1830 of publications into the document 1842, a bibliographic citation 1910 is inserted into the paper at the location of the cursor within the document 1842. As shown, the cursor is located at the end of the first sentence of the second paragraph of the depicted document 1842, thus the bibliographic citation to the selected Benamati reference is inserted at that point.

As mentioned, an inserted bibliographic citation can be inserted as a non-editable text unit. Accordingly, the bibliographic citation can only be deleted from within the editable document 1842, but it cannot be edited within the editable document 1842. In some embodiments, the non-editable text unit cannot be edited, modified, and/or deleted from the editable document through the native text editing functions of the word processing application. For example, a user cannot edit the name "Benamati" from the citation to that publication with the editable document. Rather, to edit the bibliographic citation a user must edit the bibliographic citation information of the publication through the list 1830 of publications, as previously described. When the bibliographic citation information is edited, each citation to the edited reference within the document is updated with the edited information. This feature can be performed by the citation maintenance module 410. In this way a user is prevented from mistakenly modifying the bibliographic citation and all citations to a single publication within the document 1842 are prepared consistently. Additionally, the format and content of the bibliographic citation can be completely accurate based on the selected citation format since it is prepared by the research management apparatus 104 and/or the plug-in 1802, thus eliminating the chance for human error.

Figure 20:
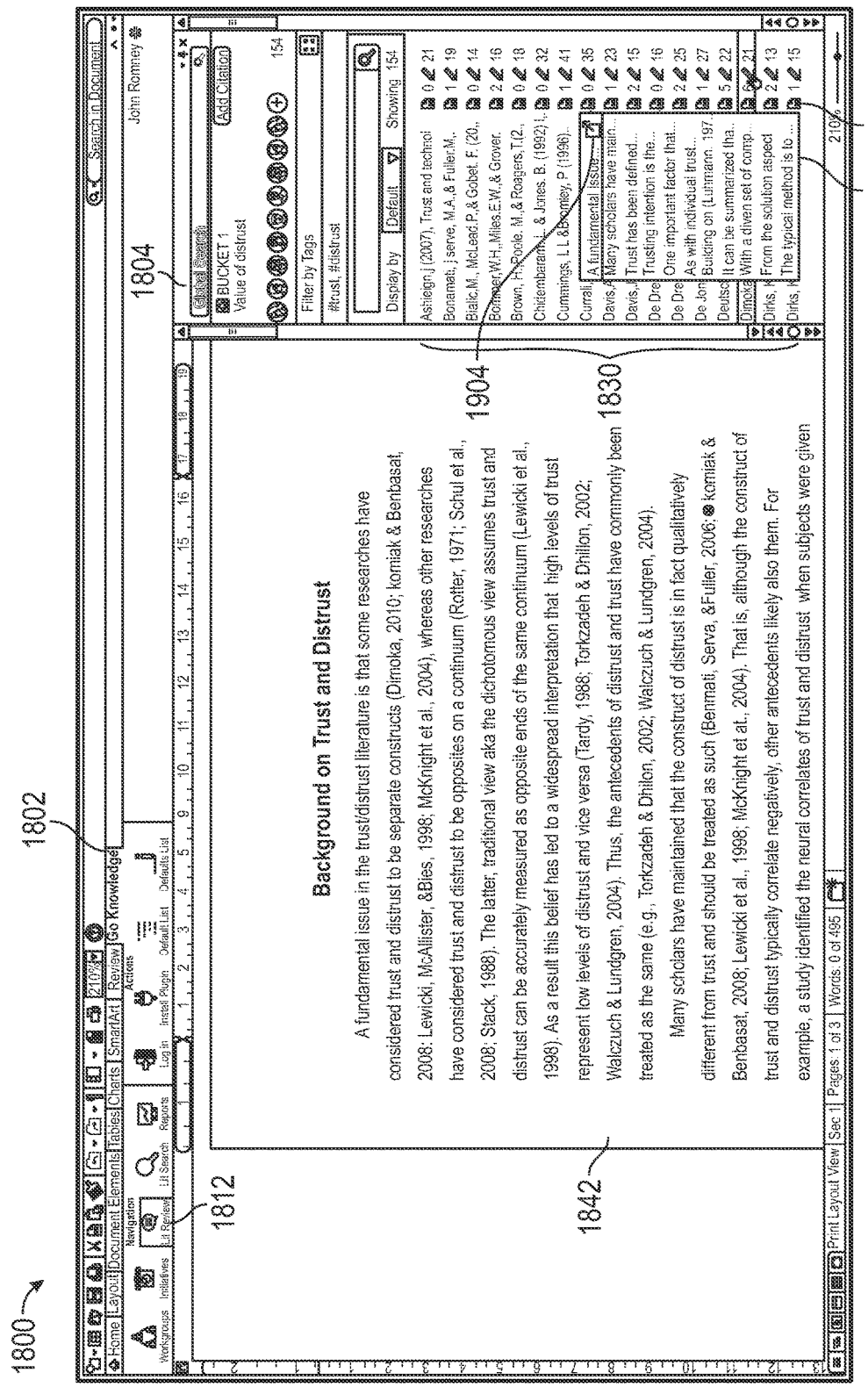
FIG. 20 is a screenshots illustrating another embodiment of a word processing application and plug-in presented by a word processing apparatus and a publication citation module, respectively.

As depicted in FIG. 20, when a user selects a citation counter 1832 of a publication from the publication list 1830, a list 2000 of all comments, highlight, and/or other literature review action made on the selected publication may be presented to the user. When a literature review action is selected from the list, the text associated with that action and/or the text of a comment or comments associated with that action can be presented to the user. In one embodiment, when a literature review action is selected from the list, the user can be presented with the option of inserting a citation into the document 1842 and specifically a citation that references the page number(s) containing the literature review action. In one embodiment, the user is also provided with the option of selecting an open icon 1904 to open the publication to the location of the literature review action, as previously described.

Figure 21:
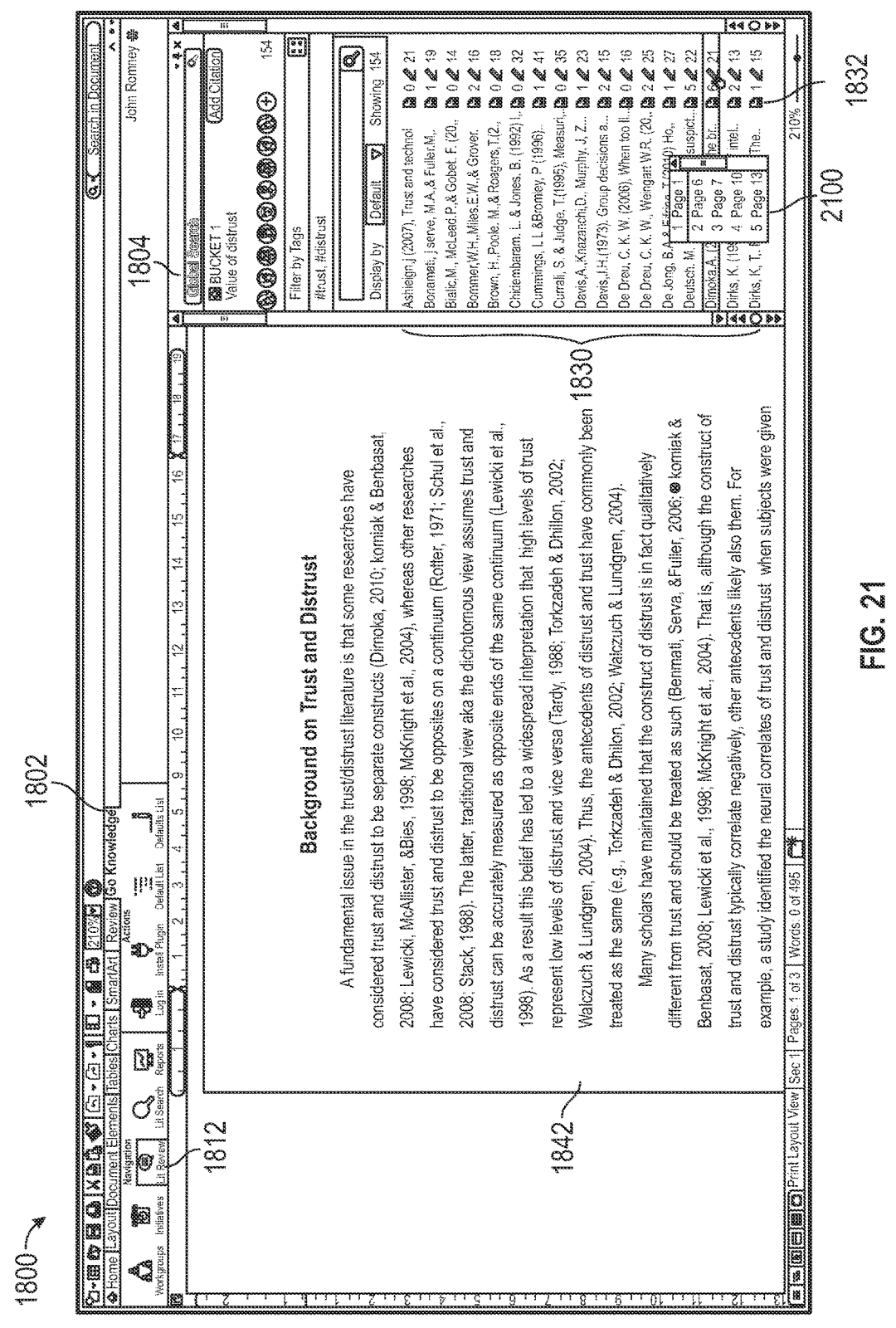

As depicted in FIG. 21, when a user selects a citation counter 1832 of a publication from the publication list 1830, a list 2100 of all places within the document 1842 where that publication is cited in the document 1842 can be shown to the user. In the depicted embodiment, the location is shown as a page number. In one embodiment, when the location of a citation is selected the word processing application 1800 is directed to scroll to/display that portion of the document 1842.

In one embodiment, when a publication is removed or deleted from the list 1830 of publications, all bibliographic citations to that publication in the document 1842 (including in a bibliography) can be deleted. In one embodiment, when all bibliographic citations to a publication are removed from the editable document 1842, the bibliographic citation to that publication in the paper's bibliography is automatically removed. These features can be performed by the citation maintenance module 410.

Figure 22:
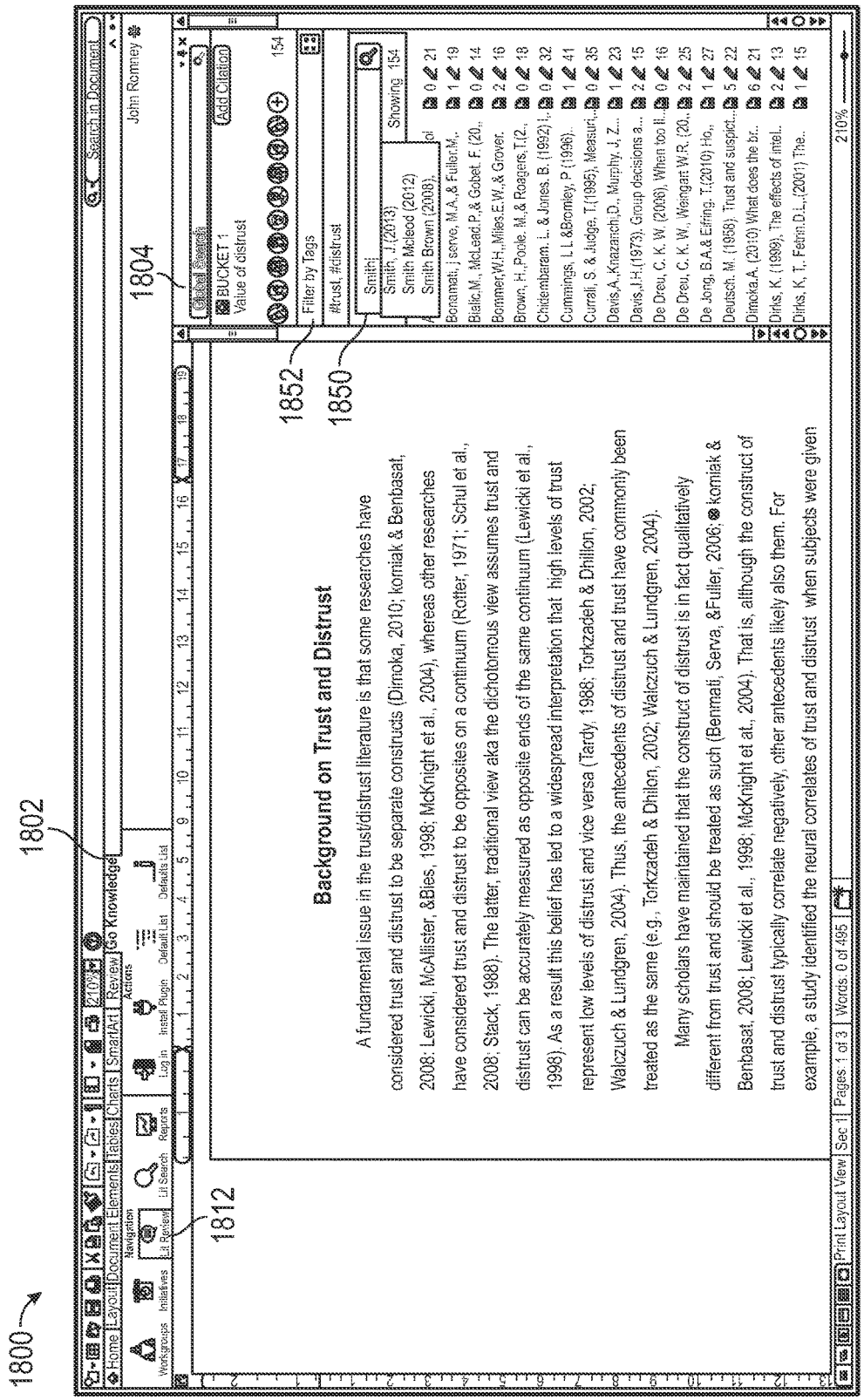
FIG. 22 is a screenshots illustrating another embodiment of a word processing application and plug-in presented by a word processing apparatus and a publication citation module, respectively.
Figure 23:
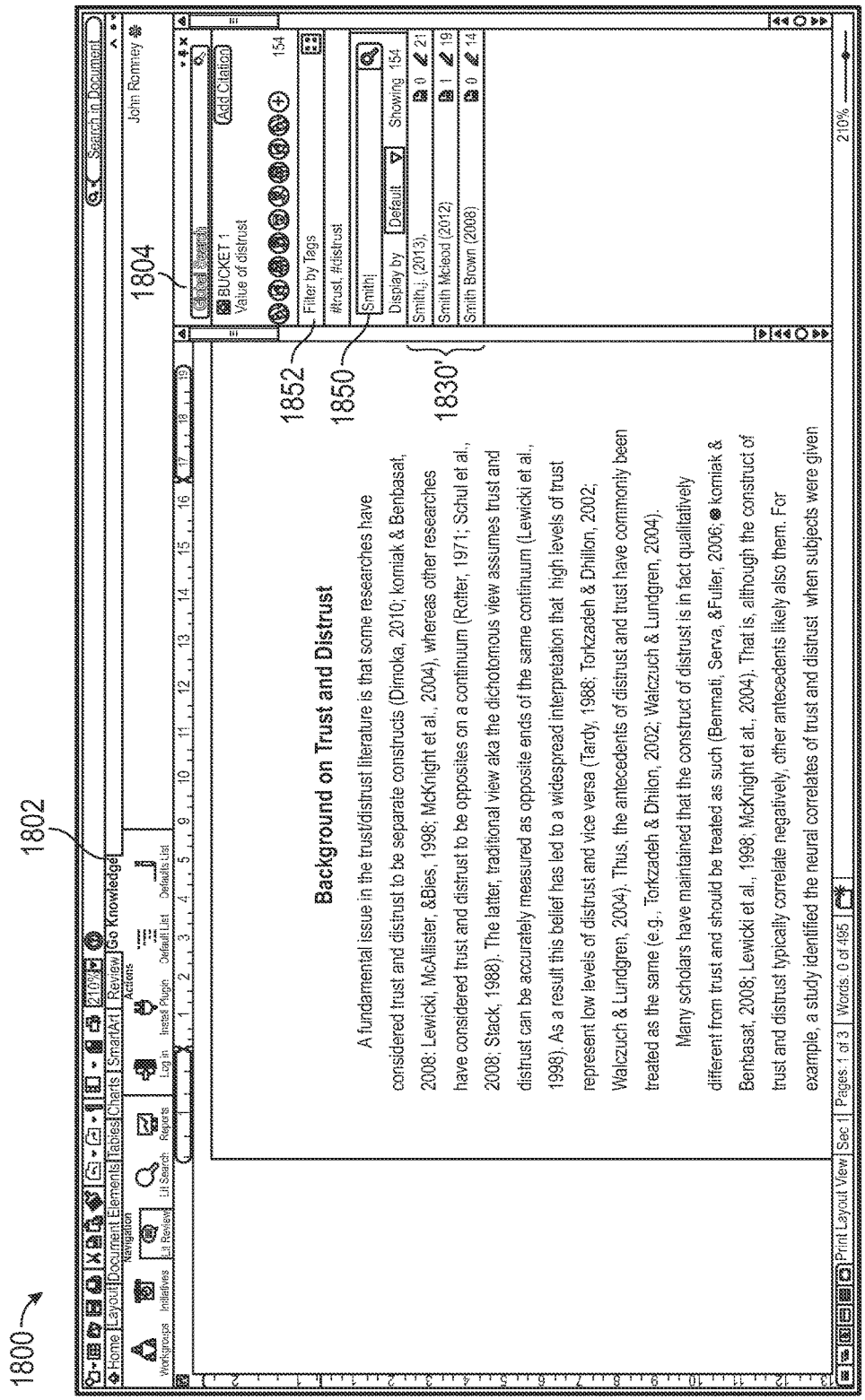
FIG. 23 is a screenshots illustrating another embodiment of a word processing application and plug-in presented by a word processing apparatus and a publication citation module, respectively.

In the depicted embodiment of FIG. 22, a user enters a search query for the name "Smith" in the search feature and also enters the tags "#trust" and "#distrust" into the search filter 1852. When this search is run, a filtered list 1830'of publications is presented with only those publications that match the search terms, as depicted in FIG. 23. This search ability can allow a user to easily search for a particular reference while they are in the process of writing a paper.

As will be understood from the foregoing discussion, a plug-in 1802 presented by the citation module 114 may simplify not only a user's ability it insert a bibliographic citation correctly into a paper, but also his/her ability to access his/her research while writing a document 1842 and his/her ability to share the document and the publication library with other users. As mentioned, while in the process of writing, a user may easily select a publication from a list 1830 of publications, identify and scroll to other parts of the paper that have cited that publication. In an embodiment, the user may also review all literature review actions (e.g., highlighting and commenting) made on the publication to quickly and easily refresh his/her memory of the publication without being required to open the entire publication. If the user wants to open the entire publication he/she can easily do so through a command within the plug-in 1802. In an embodiment, the user may also easily insert a bibliographic citation into his/her paper with the correct and uniform citation format, which can automatically generate a bibliographic citation listing in a bibliography of the paper. When editing the paper, in an embodiment, if a user chooses to remove a bibliographic citation and it is the last in the paper, the plug-in 1802 can be automatically configured to remove the bibliographic citation listing in the bibliography to that publication. Additionally, in certain embodiments, the user can be prevented from unintentionally editing the citation given the citation is non-editable within the editable document 1842. Rather, if the user chooses to edit bibliographic information for a citation, those edits can then be automatically made on every bibliographic citation within the user's paper automatically. Furthermore, in certain embodiment, the document can be embedded with the user's publication list or reference to that list, which can be access by other users who open the document. These features may reduce errors, simplify the process of preparing papers that include bibliographic citations, and sharing the document along with the list of publications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-based method for processing one or more bibliographic citations within a document, the method comprising:
   providing a first user access to a publication list through a word processing application, the publication list including bibliographic citation data for each publication in the publication list;
   upon command from the first user, inserting a bibliographic citation to a selected publication in the publication list into a document displayed by the word processing application, the bibliographic citation being inserted as a non-editable text unit;
   embedding a non-viewable identifier in the document, wherein the embedded identifier identifies the publication list and comprises non-viewable text;
   using the embedded non-viewable identifier to provide access to the publication list for a second user who accesses the document;
   upon command from the second user, editing the bibliographic citation data for the selected publication; and
   automatically updating the bibliographic citation within the document with an edited bibliographic citation when the bibliographic citation data for the selected publication is edited.

2. The method of claim 1, further comprising restricting the first user's ability to edit text of the bibliographic citation through the native text editing functions of the word processing application.

3. The method of claim 1, further comprising:
   automatically generating a bibliography in the document with bibliographic references based on the bibliographic citation inserted into the document; and
   removing a bibliographic reference to a publication from the bibliography when all bibliographic citations to the publication are removed from the document.

4. The method of claim 1, wherein the bibliographic citation is inserted into the document based on a user-selected citation format from a plurality of citation formats.

5. The method of claim 4, further comprising automatically reformatting the bibliographic citation to a new citation format when a user selects an alternate citation format.

6. The method of claim 1, wherein the publication list is stored on an online server accessed over the Internet.

7. The method of claim 6, further comprising:
providing a user access to the publication list through the Internet and the ability to edit the bibliographic citation data for each publication in the publication list through the Internet; and
wherein automatically updating the bibliographic citation includes automatically updating the bibliographic citation based on edited bibliographic citation data that is edited over the Internet.

8. The method of claim 1, wherein providing the first user access to the publication list through the word processing application includes providing the first user access to the publication list over a computer network and through the word processing application on the condition that the first user has permission to access the publication list.

9. A computer program product comprising a non-transitory computer readable storage medium storing operations executable by a processor for managing bibliographic citations within a document, the operations comprising:
storing a publication list in an electronic database, the publication list including bibliographic citation data for publications in the publication list;
upon command from a first user, inserting a bibliographic citation to a selected publication in the publication list into an electronic document displayed by a word processing application, the bibliographic citation being inserted as a non-editable text unit;
embedding a non-viewable identifier in the electronic document, wherein the embedded identifier identifies the publication list and comprises non-viewable text;
using the embedded non-viewable identifier to provide access to the publication list for a second user who accesses the electronic document;
upon command from the second user, editing the bibliographic citation data for the selected publication; and
automatically updating the bibliographic citation within the electronic document with an edited bibliographic citation when the bibliographic citation data for the selected publication is edited.

10. The computer program product of claim 9, the operations further comprising:
prohibiting the modification of the text of the bibliographic citation in the electronic document through the native text editing functions of a word processing application.

11. The computer program product of claim 9, the operations further comprising:
upon command from the first user, granting the second user permission to access the publication list by sharing the electronic document with the second user through the native sharing functions of a word processing application.

12. An apparatus for processing citations within a document, the apparatus comprising:
a citation list module configured to provide a first user access to a publication list through a word processing application, the publication list including bibliographic citation data for each publication in the publication list;
a citation insertion module configured to insert a bibliographic citation to a selected publication in the publication list into a document displayed by the word processing application upon command from the first user, the bibliographic citation being inserted as a non-editable text unit, such that the first user is restricted from editing text of the bibliographic citation through the native text editing functions of the word processing application;
a list embed module configured to embed an identifier in the document, wherein the embedded identifier identifies the publication list and comprises white text;
an access module configured to use the embedded identifier to provide access to the publication list for a second user who accesses the document; and
a citation maintenance module configured to:
upon command from the second user, edit the bibliographic citation data for the selected publication; and
automatically update the bibliographic citation within the document with an edited bibliographic citation when the bibliographic citation data for the selected publication is edited,
wherein the citation list module, the citation insertion module, the citation maintenance module, the list embed module, and the list access module comprise one or more of logic hardware and executable code, the executable code stored on a non-transitory computer readable medium.

13. The apparatus of claim 12, wherein the publication list is stored at an online location.

14. The apparatus of claim 12, further comprising a bibliography module configured to automatically generate a bibliography in the document with bibliographic references based on the bibliographic citation inserted into the document and remove a bibliographic reference to a publication from the bibliography when all bibliographic citations to the publication are removed from the document, wherein the bibliography module comprises one or more of logic hardware and executable code, the executable code stored on the non-transitory computer readable medium.

15. The apparatus of claim 12, wherein the citation maintenance module is configured to automatically reformat the bibliographic citation to a new citation format when a user selects an alternate citation format.

* * * * *